(12) United States Patent
Kikuchi et al.

(10) Patent No.: US 10,515,546 B2
(45) Date of Patent: Dec. 24, 2019

(54) DRIVING DETERMINATION DEVICE AND DETECTION DEVICE

(71) Applicant: RICOH COMPANY, LTD., Tokyo (JP)

(72) Inventors: Naoki Kikuchi, Kanagawa (JP); Ryosuke Kasahara, Kanagawa (JP); Haike Guan, Kanagawa (JP); Tomoaki Yano, Kanagawa (JP); Takashi Maki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 39 days.

(21) Appl. No.: 15/531,973

(22) PCT Filed: Dec. 2, 2015

(86) PCT No.: PCT/JP2015/005999
§ 371 (c)(1),
(2) Date: May 31, 2017

(87) PCT Pub. No.: WO2016/088375
PCT Pub. Date: Jun. 9, 2016

(65) Prior Publication Data
US 2017/0330455 A1 Nov. 16, 2017

(30) Foreign Application Priority Data

Dec. 4, 2014 (JP) .................................. 2014-246210
Feb. 2, 2015 (JP) .................................. 2015-018870
Sep. 15, 2015 (JP) .................................. 2015-181543

(51) Int. Cl.
*G06K 9/00* (2006.01)
*G08G 1/04* (2006.01)
*G08G 1/01* (2006.01)

(52) U.S. Cl.
CPC ............ *G08G 1/04* (2013.01); *G06K 9/00798* (2013.01); *G06K 9/00805* (2013.01); *G06K 9/00818* (2013.01); *G08G 1/0112* (2013.01)

(58) Field of Classification Search
CPC ........... G06K 9/00791; G06K 9/00798; G06K 9/00805; G06K 9/00818; G06K 9/00208;
(Continued)

(56) References Cited

U.S. PATENT DOCUMENTS 5,313,559 A 5/1994 Ogata et al.
5,390,284 A 2/1995 Ogata et al.
(Continued)

FOREIGN PATENT DOCUMENTS

JP 04-262453 9/1992
JP 3323894 7/2002
(Continued)

OTHER PUBLICATIONS

Partial Supplementary European Search Report dated Oct. 24, 2017 in Patent Application No. 15866152.0.
(Continued)

*Primary Examiner* — Amara Abdi
(74) *Attorney, Agent, or Firm* — Xsensus LLP

(57) ABSTRACT

A driving determination device includes an acquirer configured to acquire at least a captured image of a driving body in a driving direction and information that changes with movement of the driving body; a driving level calculator configured to calculate a driving level for evaluating a driving method for the driving body for each predetermined determination item, using at least one of the acquired captured image and the acquired information that changes with the movement of the driving body; an itemized calculator configured to calculate values based on a plurality of the calculated driving levels for each determination item;
(Continued)

and an evaluation result calculator configured to calculate a value for comprehensively evaluating the driving method for the driving body, using the values based on the driving levels for each determination item.

18 Claims, 12 Drawing Sheets

(58) Field of Classification Search
CPC . G06T 2207/20061; G06T 2207/30256; G06T 7/12; G06T 7/60; G07C 5/0808; G07C 5/0866; G08G 1/0112; G08G 1/04; B60W 40/09
See application file for complete search history.

(56) References Cited

U.S. PATENT DOCUMENTS

| | | | | |
|---|---|---|---|---|
| 9,535,878 | B1* | 1/2017 | Brinkmann | G06F 17/00 |
| 2010/0023265 | A1* | 1/2010 | Huang | B60W 40/06 |
| | | | | 702/1 |
| 2013/0204645 | A1* | 8/2013 | Lehman | G06Q 20/322 |
| | | | | 705/4 |
| 2014/0272811 | A1 | 9/2014 | Palan | |
| 2016/0042236 | A1 | 2/2016 | Ishimaru et al. | |
| 2016/0156881 | A1 | 6/2016 | Guan et al. | |

FOREIGN PATENT DOCUMENTS

| | | | | |
|---|---|---|---|---|
| JP | 2002-259703 | * | 9/2002 | G06F 17/60 |
| JP | 2002259703 | A | 9/2002 | |
| JP | 2005-202512 | | 7/2005 | |
| JP | 4476575 | | 3/2010 | |
| JP | 2010-072766 | | 4/2010 | |
| JP | 4952421 | | 3/2012 | |
| JP | 2012-103919 | | 5/2012 | |
| JP | 2012-197006 | | 10/2012 | |
| JP | 2012-247871 | | 12/2012 | |
| JP | 2013-191230 | | 9/2013 | |
| JP | 2016-103201 | | 6/2016 | |
| JP | 2016-130979 | | 7/2016 | |
| WO | WO 2014/168083 | A1 | 10/2014 | |

OTHER PUBLICATIONS

Extended European Search Report dated Feb. 12, 2018 in Patent Application No. 15866152.0 citing references AA-AB and AO therein, 11 pages.
International Search Report and Written Opinion dated Mar. 8, 2016 in PCT/JP2015/005999 filed on Dec. 2, 2015.
European Office Action dated Apr. 1, 2019 in European Patent Application No. 15 866 152.0, citing document AX therein, 6 pages.
Anonymous: "Weighted arithmetic mean—Wikipedia, the free encyclopedia", Nov. 21, 2014, XP055571616, Retrieved from the internet: https://web.archive.org/web/20141121084241/https://en.wikipedia.org/wiki/Weighted_arithmetic_mean, 7 pages.
Office Action dated Jun. 18, 2019, issued in corresponding Japanese Patent Application No. 2015-181543, 3 pages.

* cited by examiner

[Fig. 1]
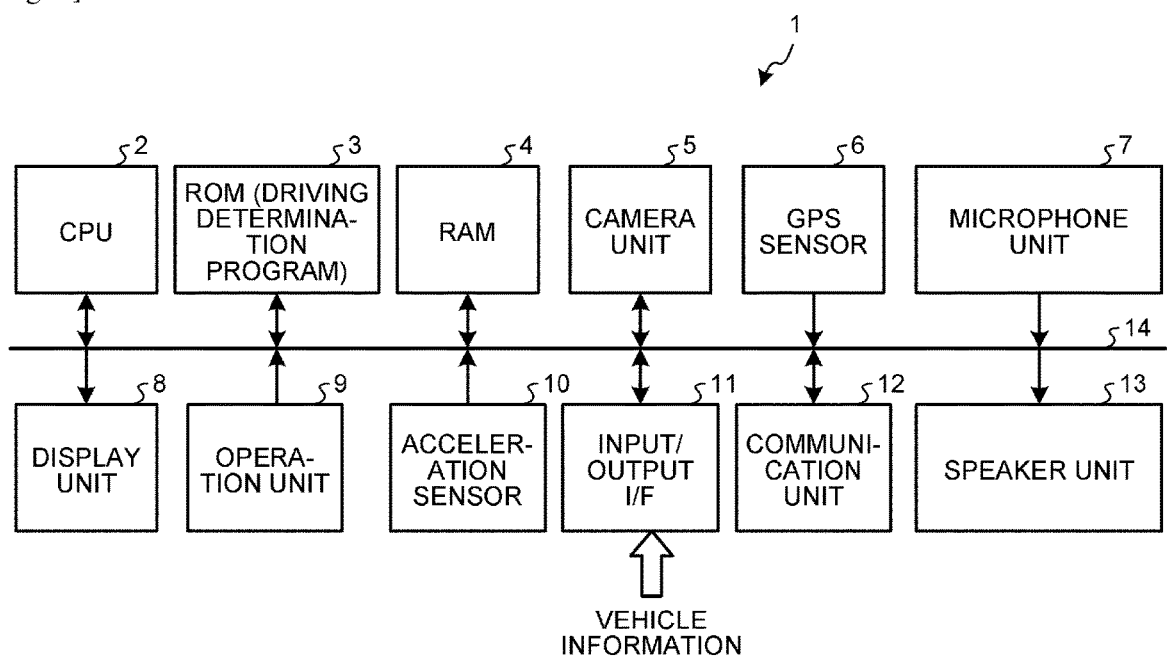

[Fig. 2]
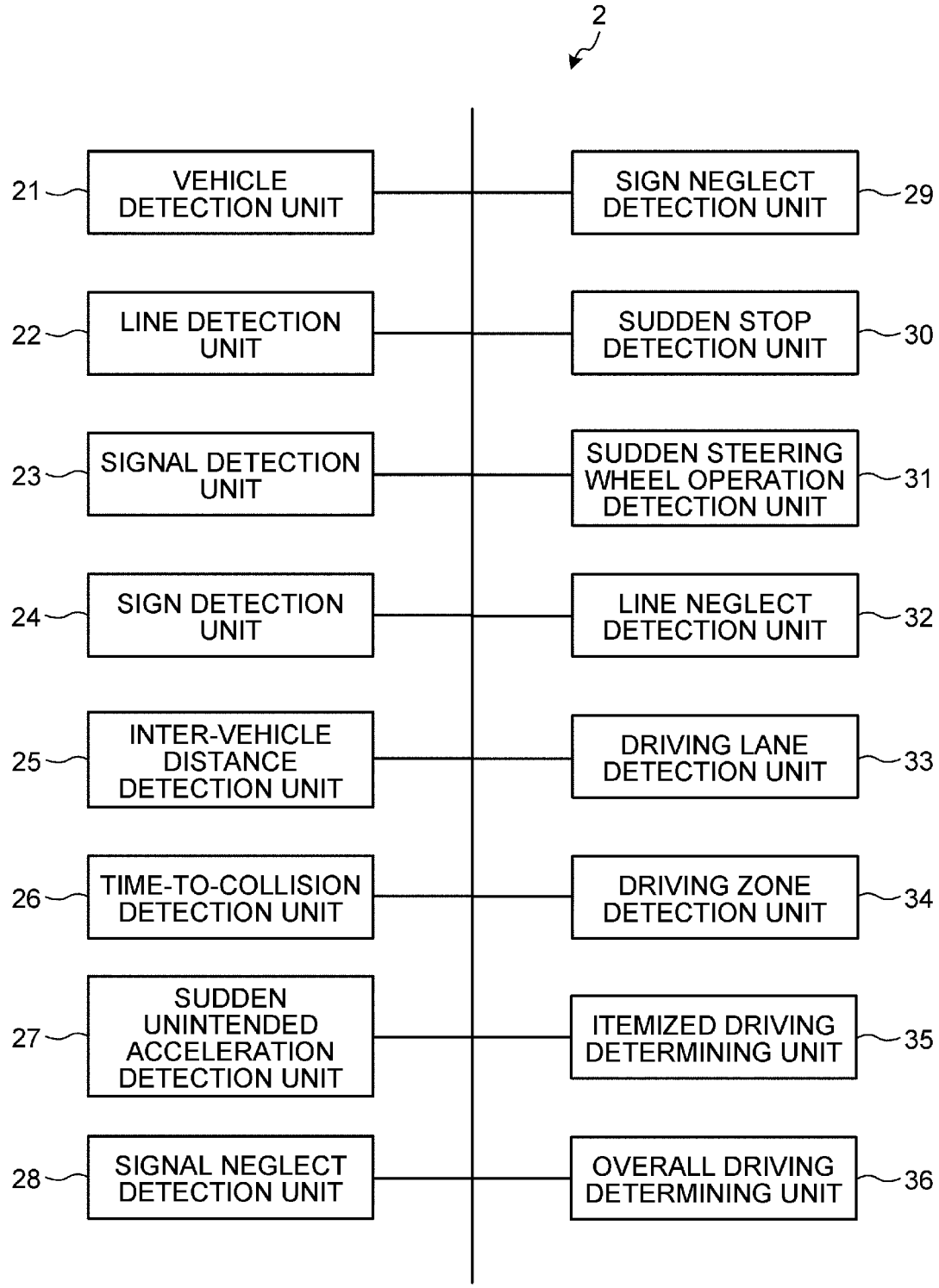

[Fig. 3]
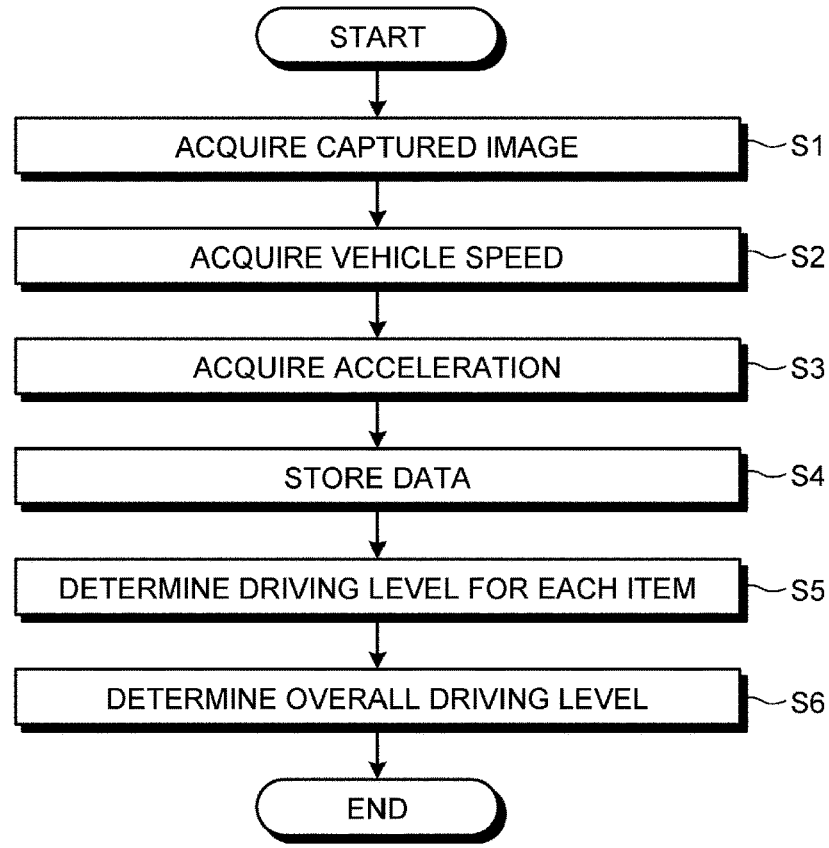
[Fig. 4]
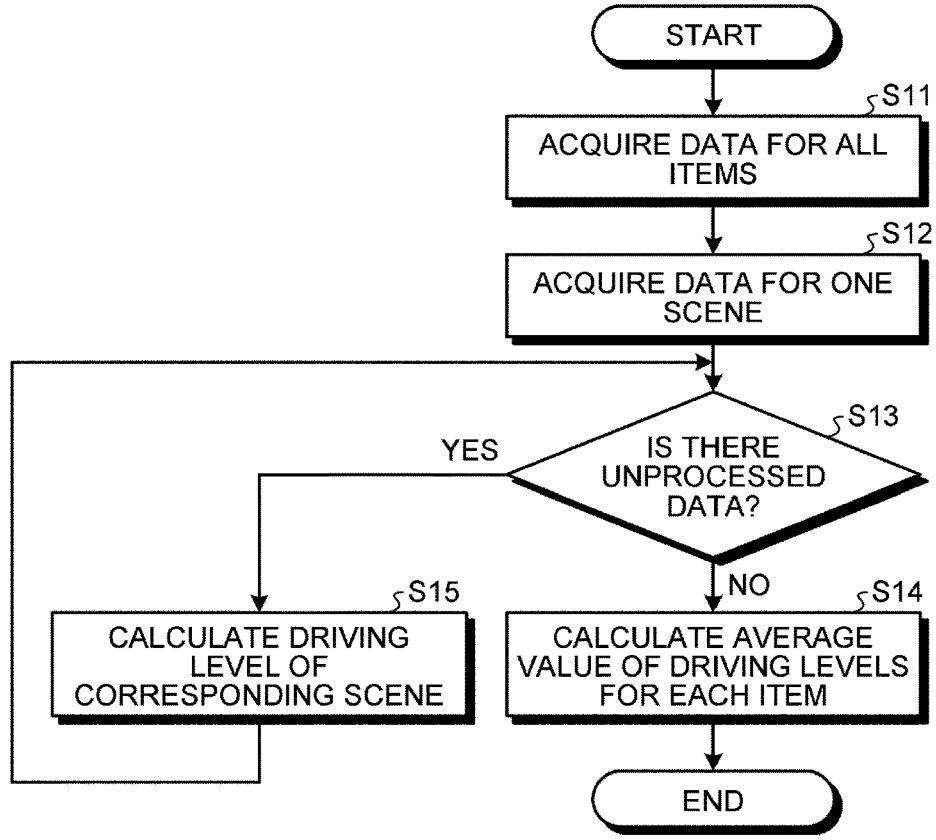

[Fig. 5]

| DETERMINATION REQUIREMENTS | | USAGE INFORMATION | | | | | |
|---|---|---|---|---|---|---|---|
| | | IMAGE | | | | SPEEDOMETER | ACCELEROMETER |
| CLASSIFICATION | ITEM | DETECTION OF VEHICLE | DETECTION OF WHITE LINE | DETECTION OF SIGNAL | DETECTION OF SIGN | SPEED | ACCELERATION |
| ACCELERATOR OPERATION | INTER-VEHICLE DISTANCE | ✓ | | | | | |
| | TIME TO COLLISION (TTC) | ✓ | | | | ✓ | |
| | SUDDEN UNINTENDED ACCELERATION | | | ✓ | | | ✓ |
| | SIGNAL NEGLECT | | | ✓ | | ✓ | |
| | SIGN NEGLECT | | | | ✓ | ✓ | |
| BRAKE OPERATION | SUDDEN STOP | ✓ | | | | | ✓ |
| | SIGNAL NEGLECT | | | ✓ | | ✓ | |
| | SIGN NEGLECT | | | | ✓ | ✓ | |
| STEERING WHEEL OPERATION | SUDDEN STEERING WHEEL OPERATION | ✓ | | | | | ✓ |
| | WHITE LINE NEGLECT | | ✓ | | | | |
| | EXCESSIVE NUMBER OF LANE CHANGES | | ✓ | | | | ✓ |
| | KEEP LEFT | ✓ | ✓ | | | | |

[Fig. 6]

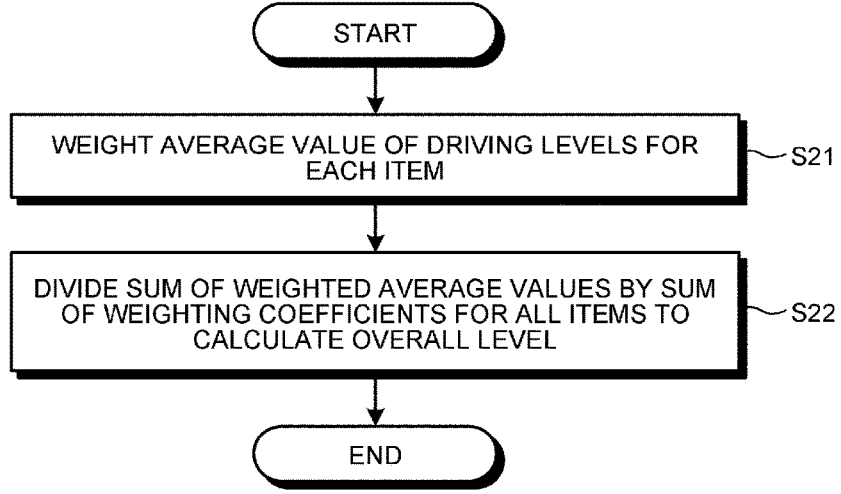

[Fig. 7]

| DETERMINATION REQUIREMENTS || DETERMINATION RESULT |||
|---|---|---|---|---|
| CLASSIFICATION | ITEM | DANGEROUS DRIVING LEVEL [0 TO 10] | WEIGHT [1 TO 3] | DANGEROUS LEVEL [A * B] |
| ACCELERATOR OPERATION | INTER-VEHICLE DISTANCE | 8 | 3 | 24 |
| | TIME TO COLLISION (TTC) | 9 | 3 | 27 |
| | SUDDEN UNINTENDED ACCELERATION | 6 | 2 | 12 |
| | SIGNAL NEGLECT | 0 | 3 | 0 |
| | SIGN NEGLECT | 0 | 2 | 0 |
| BRAKE OPERATION | SUDDEN STOP | 7 | 2 | 14 |
| | SIGNAL NEGLECT | 0 | 3 | 0 |
| | SIGN NEGLECT | 1 | 2 | 2 |
| STEERING WHEEL OPERATION | SUDDEN STEERING WHEEL OPERATION | 6 | 2 | 12 |
| | WHITE LINE NEGLECT | 3 | 1 | 3 |
| | EXCESSIVE NUMBER OF LANE CHANGES | 8 | 2 | 16 |
| | KEEP LEFT | 5 | 1 | 5 |

OVERALL LEVEL     4.4

[Fig. 8]
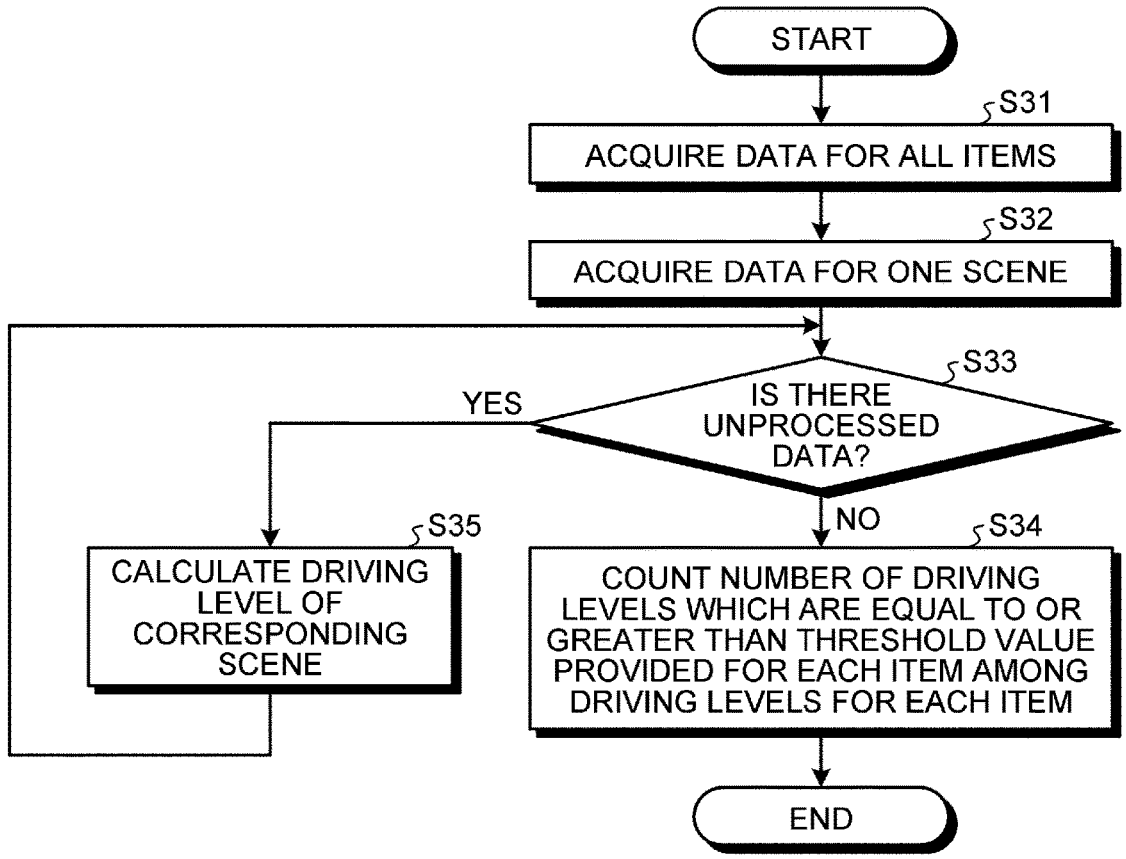
[Fig. 9]
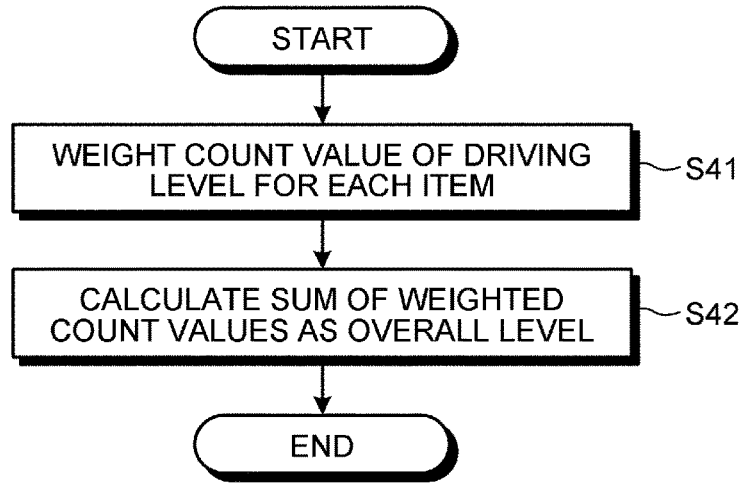

[Fig. 10]
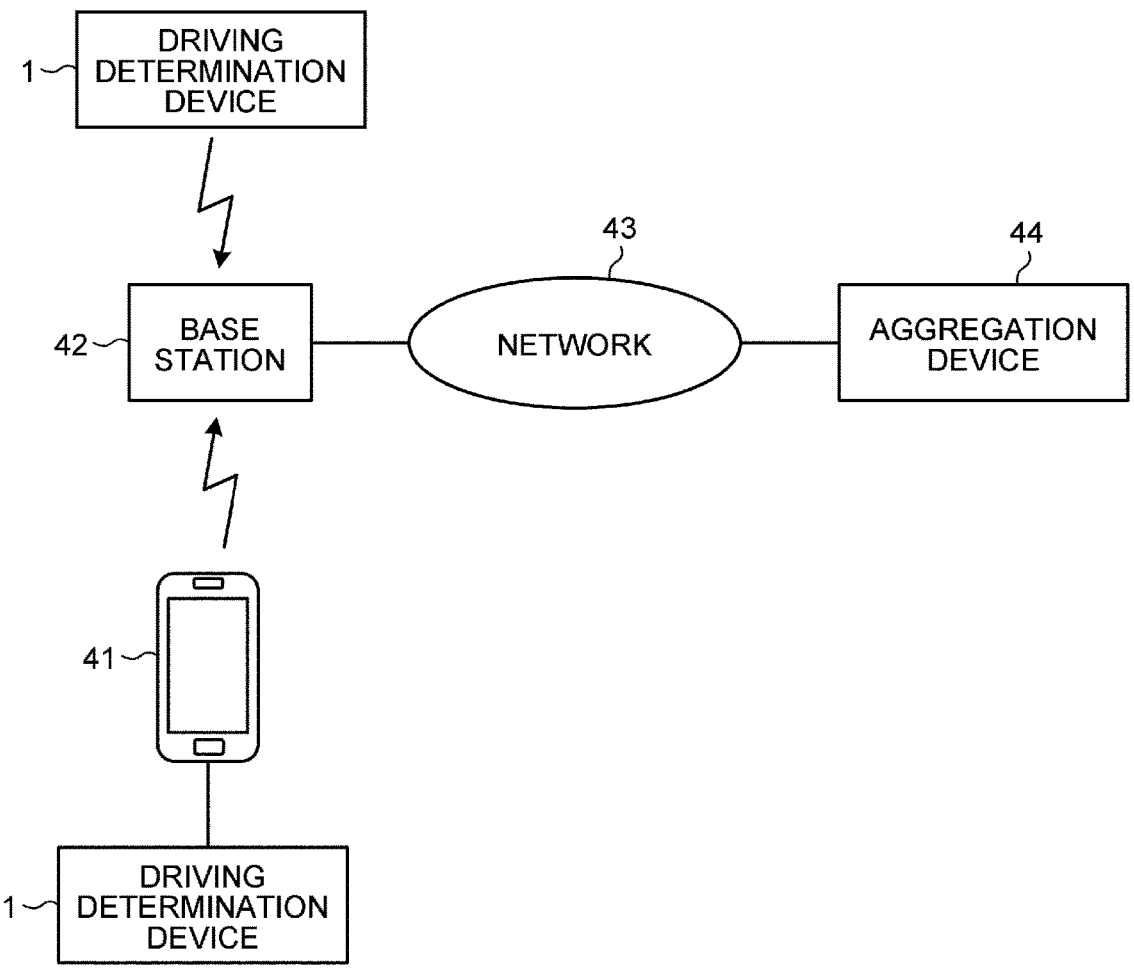
[Fig. 11]
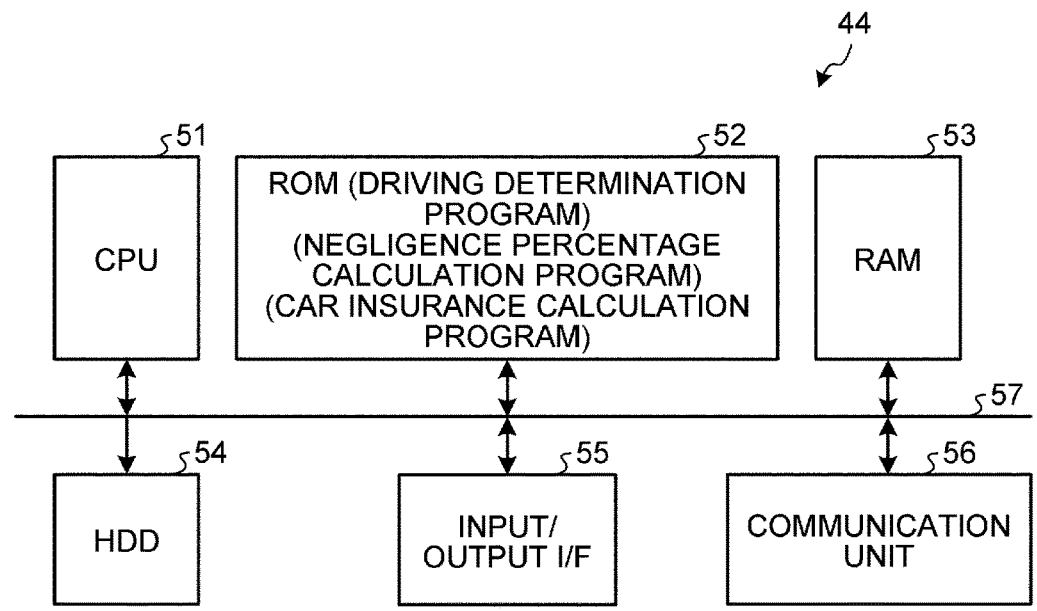

[Fig. 12]
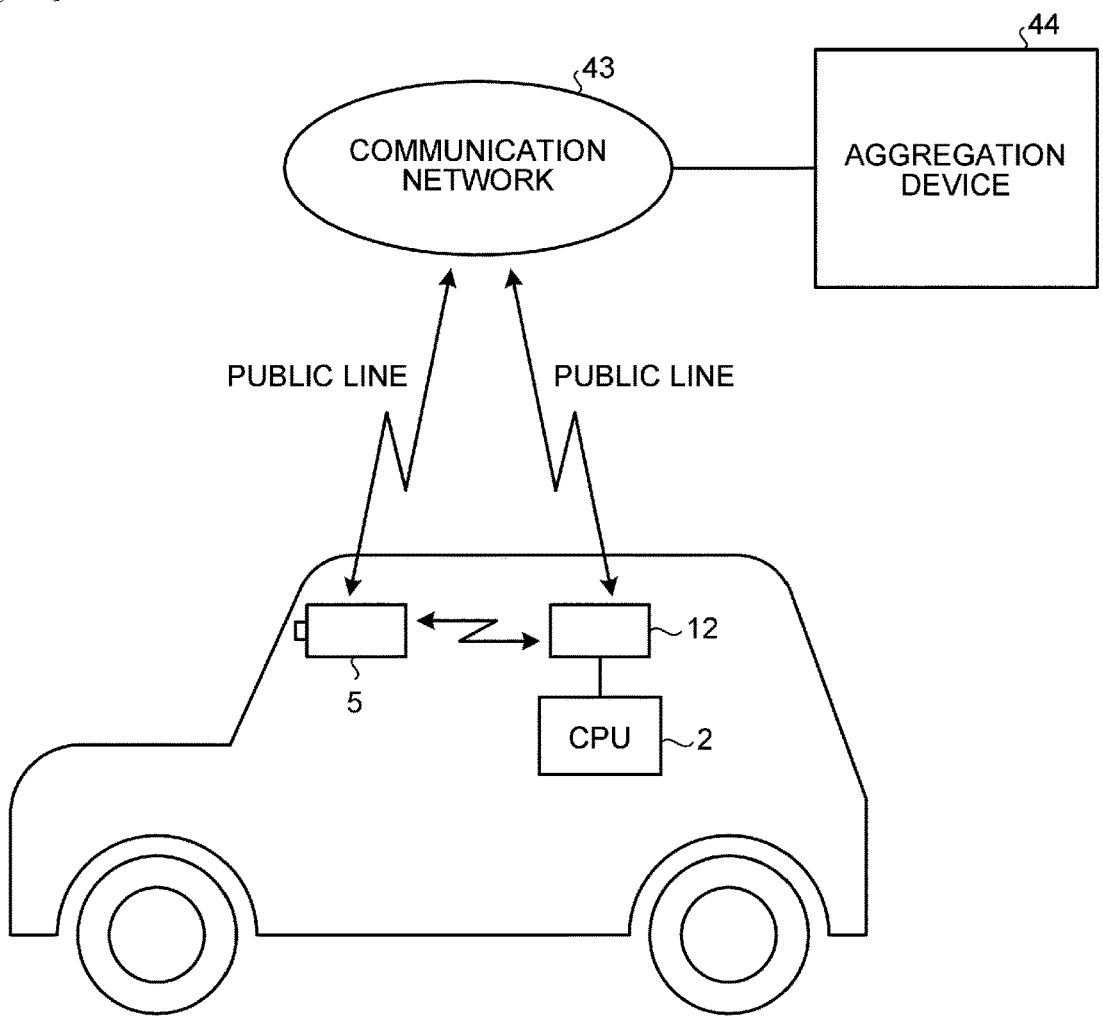
[Fig. 13A]
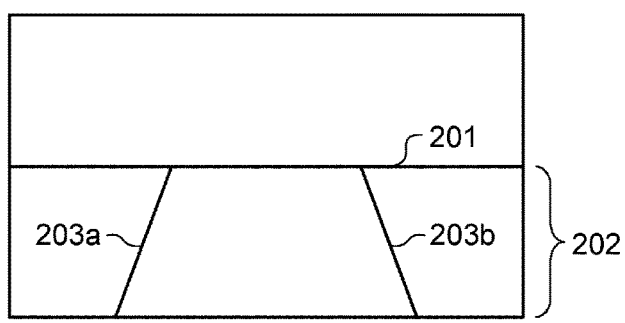
[Fig. 13B]
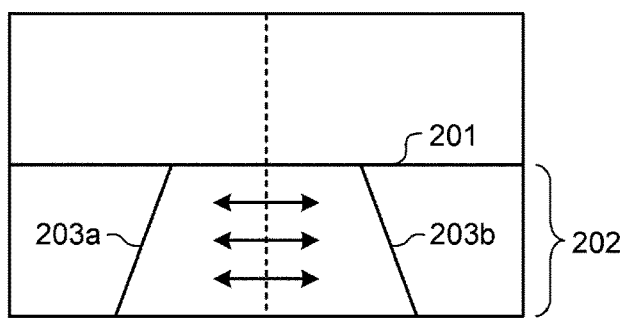

[Fig. 13C]
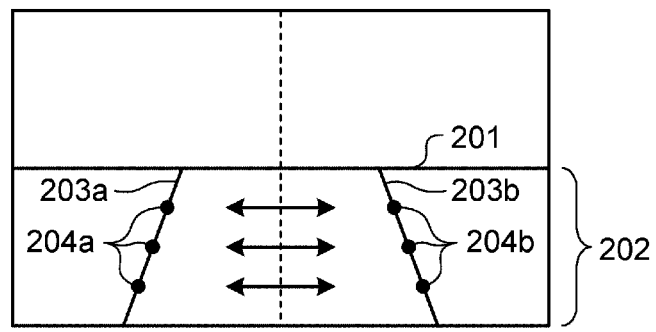
[Fig. 13D]
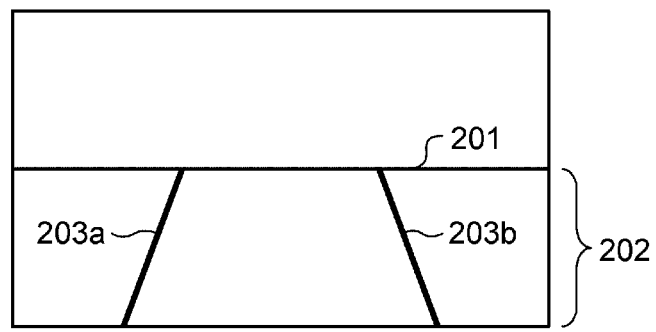
[Fig. 13E]
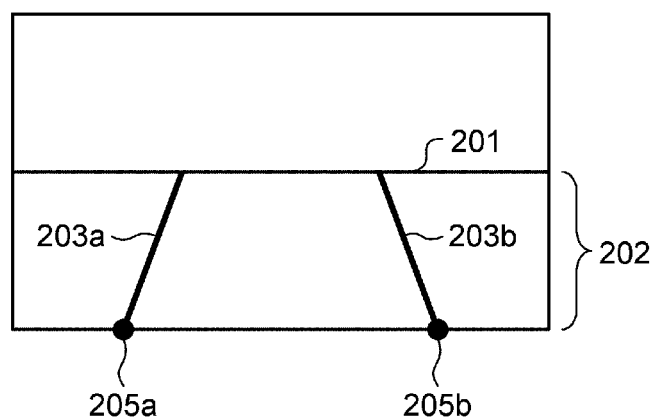

[Fig. 14]
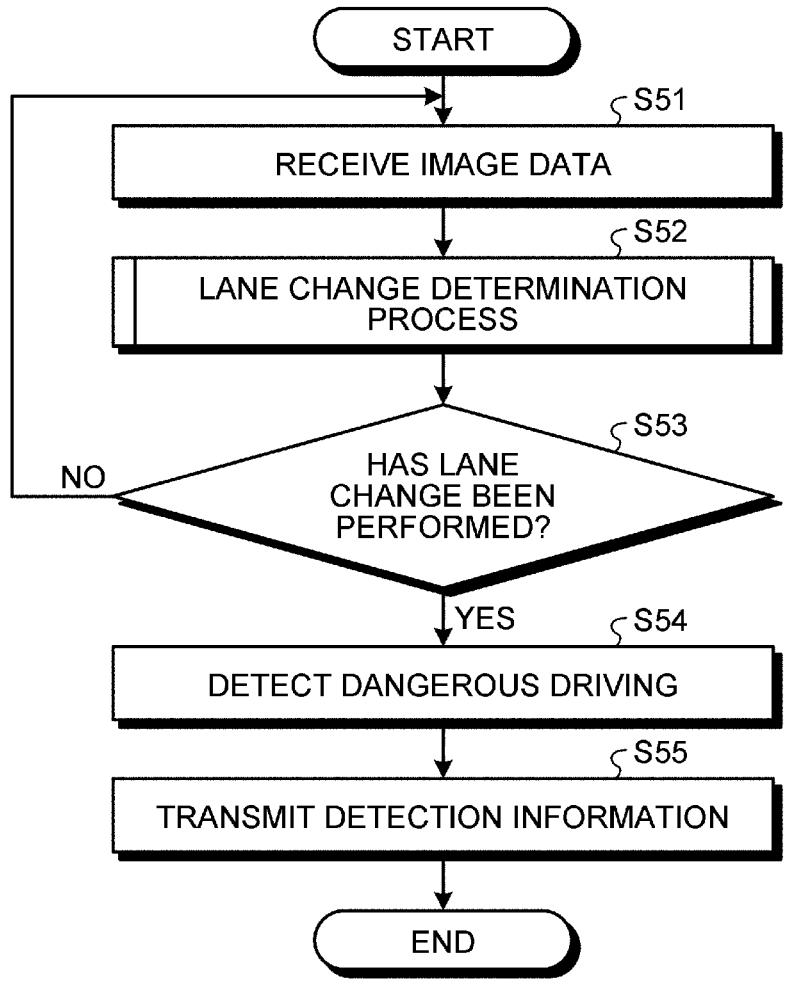

[Fig. 15]
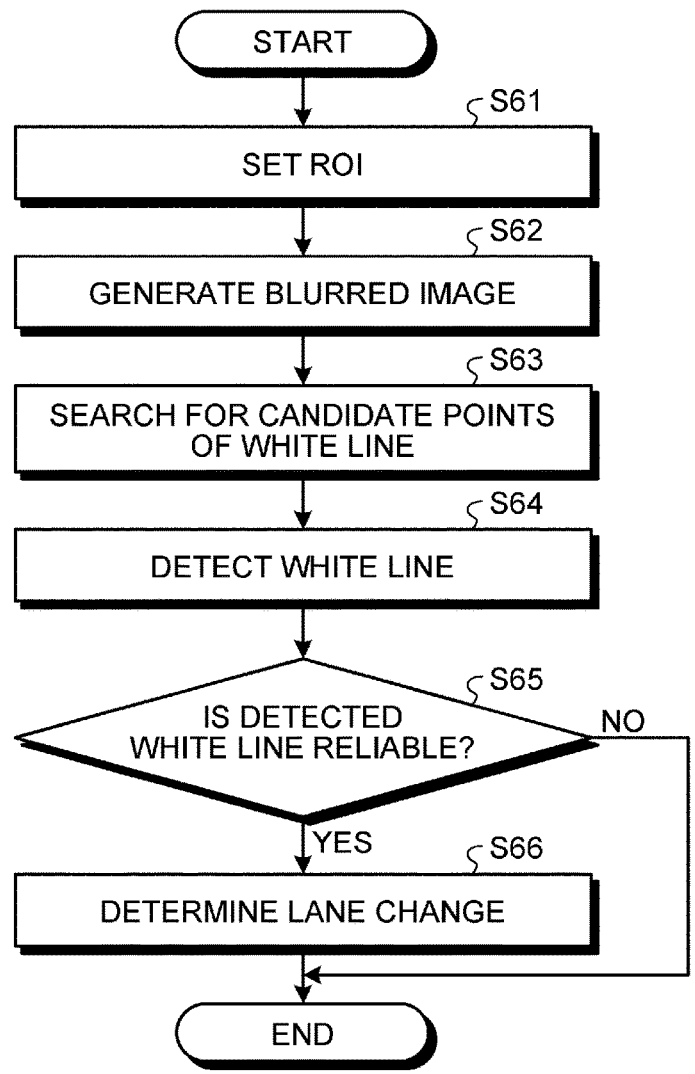
[Fig. 16]
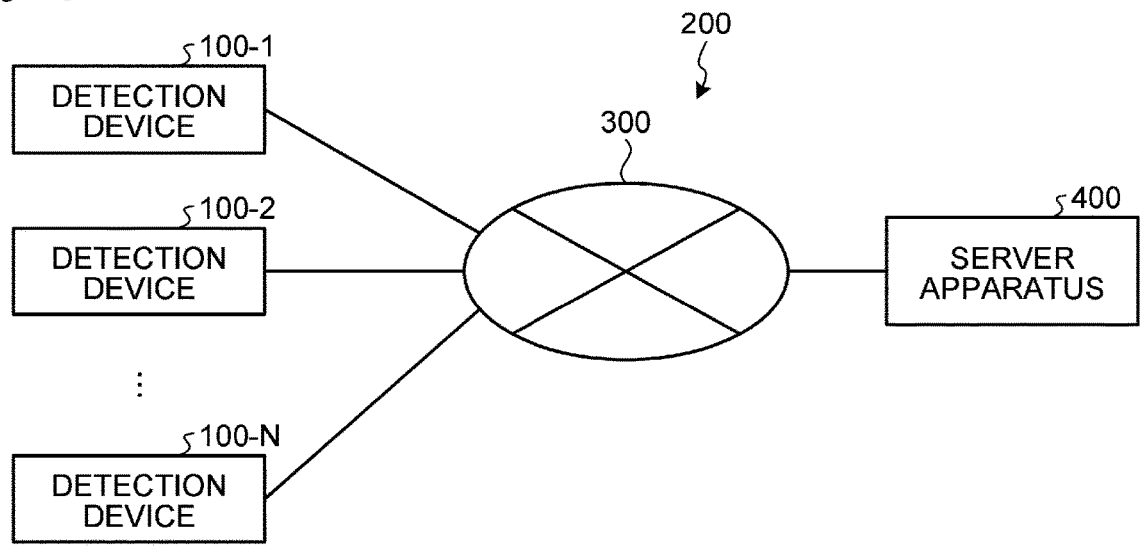

[Fig. 17]
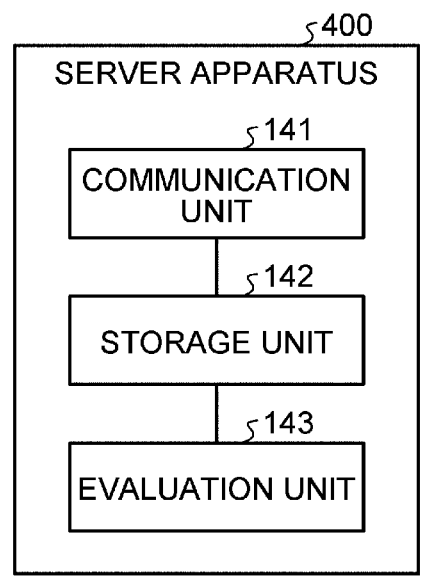
[Fig. 18]
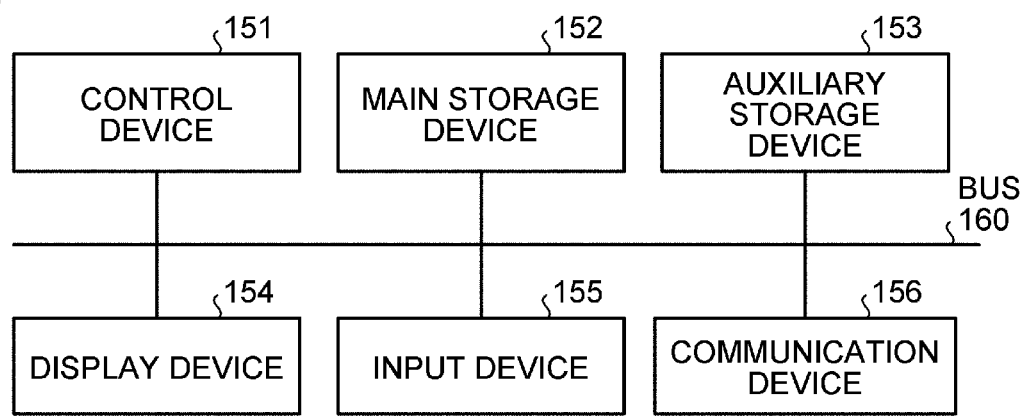

DRIVING DETERMINATION DEVICE AND DETECTION DEVICE

TECHNICAL FIELD

The present invention relates to a driving determination device and a detection device.

BACKGROUND ART

In recent years, a technique has been known which analyzes the image of the outside of a vehicle captured by an in-vehicle camera device and automatically recognizes, for example, vehicles in front and road signs. This technique is provided in, for example, a navigation system or a drive recorder device and is used, for example, to support safe driving or to detect dangerous driving.

Patent Literature 1 (Japanese Laid-open Patent Publication No. 2012-103919) discloses a passing vehicle monitoring system which detects vehicles that are dangerously driven, using a plurality of camera devices installed on the road.

SUMMARY OF INVENTION

Technical Problem

However, it is difficult to accurately recognize recognition targets such as vehicles in front and road signs. In addition, in the case of the passing vehicle monitoring system disclosed in PTL 1, large-scaled construction for installing a plurality of camera devices on the road is required and only the vehicles that travel on the road on which the camera devices are installed are monitored. That is, in the case of the passing vehicle monitoring system disclosed in PTL 1, it is possible to detect the driving characteristics of the vehicles that travel on the road on which the camera devices are installed, but it is difficult to trace and detect the driving characteristics of the same vehicle.

It is possible to accurately determine the driving characteristics of the driver by acquiring driving information for a long time. Therefore, in the technique according to the related art which determines driving characteristics from sporadic driving information, it is difficult to accurately determine the driving characteristics of the driver.

The invention has been made in view of the above-mentioned problems and an object of the invention is to provide a driving determination device, a driving determination program, a computing system, a detection device, a detection system, a detection method, and a program which can accurately determine the driving characteristics of the driver.

Solution to Problem

According to an embodiment, there is provided a driving determination device that includes: an acquirer configured to acquire at least a captured image of a driving body in a driving direction and information that changes with movement of the driving body; a driving level calculator configured to calculate a driving level for evaluating a driving method for the driving body for each predetermined determination item, using at least one of the acquired captured image and the acquired information that changes with the movement of the driving body; an itemized calculator configured to calculate values based on a plurality of the calculated driving levels for each determination item; and an evaluation result calculator configured to calculate a value for comprehensively evaluating the driving method for the driving body, using the values based on the driving levels for each determination item.

ADVANTAGEOUS EFFECTS OF INVENTION

According to the invention, it is possible to accurately determine the driving characteristics of the driver.

BRIEF DESCRIPTION OF DRAWINGS

FIG. 1 is a diagram illustrating the hardware configuration of a driving determination device according to a first embodiment.

FIG. 2 is a functional block diagram illustrating the driving determination device according to the first embodiment.

FIG. 3 is a diagram illustrating the flow of a driving determination operation of the driving determination device according to the first embodiment.

FIG. 4 is a diagram illustrating the detailed flow of an itemized driving determination operation of the driving determination device according to the first embodiment.

FIG. 5 is a diagram illustrating an example of data of each determination item which is acquired by an itemized driving determining unit of the driving determination device according to the first embodiment.

FIG. 6 is a diagram illustrating the detailed flow of an overall driving determination operation of the driving determination device according to the first embodiment.

FIG. 7 is a diagram illustrating an overall driving level calculation operation of an overall driving determining unit in the driving determination device according to the first embodiment.

FIG. 8 is a diagram illustrating the detailed flow of an itemized driving determination operation of a driving determination device according to a second embodiment.

FIG. 9 is a diagram illustrating the detailed flow of an overall driving determination operation of the driving determination device according to the second embodiment.

FIG. 10 is a diagram illustrating the structure of a computing system according to a third embodiment.

FIG. 11 is a diagram illustrating the hardware configuration of an aggregation device provided in the computing system according to the third embodiment.

FIG. 12 is a diagram illustrating the usage environment and schematic operation of an information providing system for evaluating driving characteristics according to a fourth embodiment.

FIG. 13A is a diagram illustrating an example of an ROI.

FIG. 13B is a diagram illustrating an example of a noise reduction process.

FIG. 13C is a diagram illustrating an example of an edge search process.

FIG. 13D is a diagram illustrating an example of a white line detection process.

FIG. 13E is a diagram illustrating an example of a lane change determination process.

FIG. 14 is a flowchart illustrating an example of a detection method of a detection device according to a fifth embodiment.

FIG. 15 is a flowchart illustrating an example of a lane change determination process of the detection device according to the fifth embodiment.

FIG. 16 is a diagram illustrating an example of the structure of a detection system according to a sixth embodiment.

FIG. 17 is a diagram illustrating an example of the structure of a server apparatus in the detection system according to the sixth embodiment.

FIG. 18 is a diagram illustrating an example of the hardware configuration of the server apparatus in the detection system according to the sixth embodiment.

DESCRIPTION OF EMBODIMENTS

Hereinafter, embodiments of the invention will be described in detail.

First Embodiment

First, a driving determination device according to a first embodiment of the invention will be described. Hereinafter, it is assumed that the driving determination device determines a driving method for a vehicle which is an example of a driving body.

Hardware Configuration of Driving Determination Device

FIG. 1 is a diagram illustrating the hardware configuration of a driving determination device 1 according to the first embodiment. As illustrated in FIG. 1, the driving determination device 1 includes a CPU 2, ROM 3, RAM 4, a camera unit 5, a GPS sensor 6, a microphone unit 7, a display unit 8, an operation unit 9, an acceleration sensor 10, an input/output I/F 11, a communication unit 12, and a speaker unit 13. The CPU is an abbreviation of "Central Processing Unit". The ROM is an abbreviation of "Read Only Memory". The RAM is an abbreviation of "Random Access Memory". The GPS is an abbreviation of "Global Positioning System". For example, the driving determination device 1 is provided in the vehicle such that the camera unit 5 captures an image in a driving direction of the vehicle.

The camera unit 5, the acceleration sensor 10, and the input/output I/F 11 are an example of an acquisition unit. The acceleration of the vehicle detected by the acceleration sensor 10 and the driving speed of the vehicle which is detected from vehicle information supplied through the input/output I/F 11 are an example of information which changes with the movement of the vehicle.

The CPU 2 determines a driving level, which will be described below, according to a driving determination program stored in the ROM 3. The ROM 3 stores an operating system (OS), which is basic software, and the driving determination program for determining the driving level. In the RAM 4, a vehicle detection unit 21 to an overall driving determining unit 38 (each function) which correspond to the driving determination program and will be described with reference to FIG. 2 are developed.

The camera unit 5 is a so-called stereo camera device including an imaging unit for a right eye and an imaging unit for a left eye. The camera unit 5 generates a parallax image from captured images which are obtained by the imaging unit for a right eye and the imaging unit for a left eye. The CPU 2 detects, for example, vehicles which travel in front, an inter-vehicle distance, a driving line, guard rails, obstacles, pedestrians, traffic signs, and road signs, using the parallax image from the camera unit 5. The GPS sensor 6 detects the current driving position of the vehicle provided with the driving determination device 1. The microphone unit 7 collects sounds outside the vehicle. The display unit 8 displays, for example, an operation menu and the image which is currently captured by the camera unit 5. The operation unit 9 enables an operation of selecting a desired operation menu. The acceleration sensor 10 detects the acceleration of the vehicle generated by, for example, a steering wheel operation for the vehicle.

In recent years, the vehicle has been provided with a self-diagnosis function which is called on-board diagnosis (OBD). The recent vehicle can acquire vehicle information, such as a driving speed, the current engine RPM, an engine load factor, the degree of opening of a throttle, and a coolant temperature, through a data link connector (DLC) of the OBD. The vehicle information is supplied to the input/output interface (input/output I/F) 11 through the DLC.

The CPU 2 acquires, as the vehicle information (OBD data), various kinds of information, such as a vehicle speed, an engine RPM, an engine load factor, an ignition time, the pressure of an intake manifold, intake air mass (MAF), an injection start time, and the temperature of an engine coolant (coolant temperature). In addition, the CPU 2 acquires, as the vehicle information, various kinds of information, such as the temperature of air flowing to the engine (intake-air temperature), the temperature outside the vehicle (outdoor temperature), a fuel flow rate, instantaneous fuel consumption, the degree of depression of an accelerator (the degree of opening of a throttle), blinker information (operation information of the left and right blinkers), the degree of depression of a brake, and the rotation angle information of a steering wheel. The CPU 2 detects, for example, the current driving speed, an accelerator operation, a brake operation, and a steering wheel operation and performs failure diagnosis, on the basis of the vehicle information.

The communication unit 12 can perform wired communication or wireless communication through a network. The speaker unit 13 outputs a warning message when an unpreferable driving operation, such as a sudden steering wheel operation or a sudden brake operation, and outputs a sound indicating the determination result of driving, which will be described below.

Software Configuration of Driving Determination Device

FIG. 2 is a functional block diagram illustrating each function which is implemented by the execution of the driving determination program by the CPU 2. As illustrated in FIG. 2, the CPU 2 functions as a vehicle detection unit 21, a line detection unit 22, a signal detection unit 23, a sign detection unit 24, an inter-vehicle distance detection unit 25, a time-to-collision detection unit (TTC detection unit) 26, and a sudden unintended acceleration detection unit 27. In addition, the CPU 2 functions a signal neglect detection unit 28, a sign neglect detection unit 29, a sudden stop detection unit 30, a sudden steering wheel operation detection unit 31, a line neglect detection unit 32, and a driving lane detection unit 33. Furthermore, the CPU 2 functions as a driving position detection unit 34, an itemized driving determining unit 35 and an overall driving determining unit 36.

The vehicle detection unit 21 to the itemized driving determining unit 35 are an example of a driving level calculation unit. In addition, the itemized driving determining unit 35 is an example of an itemized calculation unit. The overall driving determining unit 36 is an example of a weighting unit and an evaluation result calculation unit.

In the description of this example, it is assumed that the vehicle detection unit 21 to the overall driving determining unit 36 are implemented by software. However, some or all of the vehicle detection unit 21 to the overall driving determining unit 36 may be implemented by hardware.

The driving determination program may be recorded as an installable or executable file on a computer-readable recording medium, such as a CD-ROM or a flexible disk (FD), and then provided. In addition, the driving determination program may be recorded on a computer-readable recording medium, such as a CD-R, a DVD, a Blu-ray disc (registered trademark), or a semiconductor memory, and then provided. The DVD is an abbreviation of "Digital Versatile Disk". The driving determination program may be provided through a network such as the Internet. In addition, the driving determination device 1 may download the driving determination program through the network, install the driving determination program in, for example, the RAM 4, and execute the driving determination program. The driving determination program may be incorporated into, for example, the RAM 4 of the driving determination device 1 in advance and then provided.

The vehicle detection unit 21 detects vehicles in front using the parallax image obtained from the camera unit 5. The line detection unit 22 detects lines, such as the center line and edge line of the road, using the parallax image. The signal detection unit 23 detects the color of the traffic light turned on (a blue light, a yellow light, or a red light), using the parallax image. The sign detection unit 24 detects a road sign, such as "No Entry", "Temporary Stop", or "No Parking", using the parallax image. The inter-vehicle distance detection unit 25 detects the distance between the host vehicle and the vehicle in front, using the parallax image. The time-to-collision detection unit 26 detects the time to collision with the vehicle in front, from the distance between the host vehicle and the vehicle in front and the current driving speed.

The sudden unintended acceleration detection unit 27 detects the sudden unintended acceleration of the vehicle, using the acceleration detected by the acceleration sensor 10. The signal neglect detection unit 28 detects whether the driver has neglected a traffic signal, using the output of the detected color of the traffic light that is turned on and the driving speed of the vehicle. The sign neglect detection unit 29 detects whether the driver has neglected a road sign, using the output of the detected road sign and the detected driving speed of the vehicle. The sudden stop detection unit 30 detects whether the vehicle has been suddenly stopped, using the distance between the host vehicle and the vehicle in front and the detected output of the acceleration sensor 10.

The sudden steering wheel operation detection unit 31 detects whether the steering wheel has been suddenly turned, using the distance between the host vehicle and the vehicle in front and the output of the detected acceleration. The line neglect detection unit 32 detects whether the driver has neglected a line, using the output of the line detection result of the line detection unit 22. The driving lane detection unit 33 detects the driving lane, using the output of the line detection result of the line detection unit 22 and counts the number of lane changes. The driving position detection unit 34 detects a driving zone in which the vehicle is traveling, using the parallax image and the output of the line detection result of the line detection unit 22. The output of the detection result of the driving zone is used to determine whether the vehicle is traveling in the driving zone in which the vehicle needs to travel on the basis of the traffic rules. That is, for example, when the traffic rules regulate that traffic must keep to the left, the output of the detection result of the driving zone is used to whether traffic keeps to the left.

The itemized driving determining unit 35 calculates the driving level for each item on the basis of the outputs of the detection results of the vehicle detection unit 21 to the driving zone detection unit 34. The overall driving determining unit 36 calculates the overall driving level, using the each driving level calculated for each item.

Flow of Driving Determination Operation

Next, the flow of the driving determination operation of the driving determination device 1 according to the first embodiment is illustrated in the flowchart of FIG. 3. For example, when the driving of the vehicle starts, power is supplied from a battery to the driving determination device 1, and the OS starts, the CPU 2 reads the driving determination program stored in the ROM 3. Then, the CPU 2 develops the units 21 to 36, which have been described with reference to FIG. 2, in the RAM 4. Then, the driving determination operation starts and the processes illustrated in the flowchart of FIG. 3 are sequentially performed from Step S1.

In Step S1, the CPU 2 acquires each frame of the parallax image (captured image) which is output from the camera unit 5 at an interval of, for example, 1/60 seconds and sequentially stores the acquired image in the RAM 4. In Step S2, the CPU 2 acquires the driving speed of the vehicle corresponding to each frame of the parallax image from the vehicle information supplied through the input/output I/F 11 and sequentially stores the driving speed in the RAM 4. In Step S3, the CPU 2 acquires the output of the detected acceleration, which corresponds to each frame of the parallax image, from the acceleration sensor 10 and sequentially stores the output in the RAM 4. In this way, each frame of the parallax image, the driving speed, and the acceleration are stored in the RAM 4 (Step S4).

Then, in Step S5, the itemized driving determining unit 35 determines the driving level for each item, which will be described below, using the detection results output from the vehicle detection unit 21 to the driving zone detection unit 34 (itemized driving determination operation). Then, in Step S6, the overall driving determining unit 36 calculates the overall driving level, using each driving level which has been calculated for each item (overall driving determination operation).

Itemized Driving Determination Operation

Next, the detailed flow of the itemized driving determination operation in Step S5 is illustrated in the flowchart of FIG. 4. In Step S4 of the flowchart illustrated in FIG. 3, when each frame of the parallax image, the driving speed, and the acceleration are stored in the RAM 4, the process in the flowchart of FIG. 4 starts from Step S11.

In Step S11, the itemized driving determining unit 35 acquires data for all of the determination items. For example, the driving determination device 1 according to the first embodiment determines the driving level for each determination item, such as an "inter-vehicle distance", "time-to-collision", "sudden unintended acceleration", "signal neglect", and "sign neglect" included in a classification "accelerator operation", as illustrated in FIG. 5. In addition, the driving determination device 1 determines the driving level for each determination item, such as "sudden stop", "signal neglect", and "sign neglect" included in a classification "brake operation". Furthermore, the driving determination device 1 determines the driving level for each determination item, such as "sudden steering wheel operation", "white line neglect", "excessive number of lane changes", and "keep left" included in a classification "steering wheel operation".

Therefore, in Step S11, the inter-vehicle distance detection unit 25 acquires the vehicle detection information of the vehicle in front, which has been detected from the parallax image by the vehicle detection unit 21, from the RAM 4. In Step S11, the time-to-collision detection unit 26 acquires the parallax image and the driving speed information of the host vehicle corresponding to the parallax image from the RAM 4. The signal detection unit 23 detects the color of the traffic light that is turned on, using the parallax image, and stores turned-on light color information indicating the detected color of the traffic light that is turned on in the RAM 4, as described above. The sudden unintended acceleration detection unit 27 acquires the turned-on light color information of the traffic signal and the acceleration information detected by the acceleration sensor 10 in the RAM 4 in Step S11.

Furthermore, in Step S11, the signal neglect detection unit 28 acquires the turned-on light color information detected by the signal detection unit 23 and the driving speed of the host vehicle from the RAM 4. The sign detection unit 24 performs a template matching process, using the parallax image and the template image of each sign, to detect a road sign provided at the driving position of the host vehicle and stores sign detection information indicating the detected road sign in the RAM 4. The sign neglect detection unit 29 acquires the sign detection information and the driving speed of the host vehicle from the RAM 4 in Step S11.

In Step S11, the sudden stop detection unit 30 acquires the vehicle detection information of the vehicle in front and the acceleration information from the RAM 4. In addition, in Step S11, the sudden steering wheel operation detection unit 31 acquires the vehicle detection information of the vehicle in front and the acceleration information from the RAM 4. The line detection unit 22 detects lines, such as the center line of the road and the edge line of the road, from the parallax image and stores line detection information in the RAM 4. In Step S11, the line neglect detection unit 32 acquires the line detection information from the RAM 4. In Step S11, the driving lane detection unit 33 acquires the line detection information and the acceleration information from the RAM 4. The driving zone detection unit 34 acquires the vehicle detection information of the vehicle in front and the line detection information from the RAM 4.

As such, when the inter-vehicle distance detection unit 25 to the driving zone detection unit 34 acquire data required to calculate the driving level for each determination item, the process proceeds to Step S12. In Step S12, the inter-vehicle distance detection unit 25 to the driving zone detection unit 34 acquire data corresponding to one predetermined scene from the RAM 4.

In Step S13, the itemized driving determining unit 35 determines whether the calculation of the driving level for each determination item by the inter-vehicle distance detection unit 25 to the driving zone detection unit 34 has ended. In other words, in Step S13, the itemized driving determining unit 35 determines whether there is data which has not processed in the information (data) of each determination item calculated by the inter-vehicle distance detection unit 25 to the driving zone detection unit 34.

In Step S15, the inter-vehicle distance detection unit 25 to the driving zone detection unit 34 calculate the driving level for each determination item (Step S13: Yes). Specifically, the inter-vehicle distance detection unit 25 calculates the driving level corresponding to the distance between the host vehicle and the vehicle in front which has been detected from a plurality of frames of parallax images acquired from the RAM 4. Specifically, when the inter-vehicle distance is less than 100 m, the intervehicle distance detection unit 25 calculates the driving level corresponding to the inter-vehicle distance as "0 (the degree of risk is 0)". On the other hand, when the inter-vehicle distance is equal to or less than 100 m, the inter-vehicle distance detection unit 25 calculates "(100−distance [m])÷10" and calculates the driving level corresponding to the inter-vehicle distance. As the driving level corresponding to the intervehicle distance increases, the degree of risk increases.

The time-to-collision detection unit 26 calculates the driving level corresponding to the time until the host vehicle collides with the vehicle in front, from the parallax image and the driving speed information of the host vehicle corresponding to the parallax image acquired from the RAM 4. Specifically, when the time until the host vehicle collides with the vehicle in front is equal to or more than 10 seconds, the time-to-collision detection unit 26 calculates the driving level corresponding to the time to collision as "0 (the degree of risk is 0)". On the other hand, when the time until the host vehicle collides with the vehicle in front is less than 10 seconds, the time-to-collision detection unit 26 calculates "10 seconds−the time-to-collision [second]" and calculates the driving level corresponding to the time to collision. As the driving level corresponding to the time to collision increases, the degree of risk increases.

The sudden unintended acceleration detection unit 27 calculates the degree of acceleration of the host vehicle from the turned-on light color information of the traffic signal and the acceleration information acquired from the RAM 4. That is, when the acceleration of the host vehicle is high even though the time elapsed from a change in the color of the traffic light from red to blue is short, it means that sudden unintended acceleration has occurred. In addition, when acceleration is maintained at a substantially constant value after the color of the traffic light is changed from red to blue, it means that the driver has accelerated the vehicle for safe driving. The sudden unintended acceleration detection unit 27 calculates the degree of acceleration.

Specifically, when acceleration $[m/s^2]$ is greater than 0 $[m/s^2]$ and equal to or less than 300 $[m/s^2]$, the sudden unintended acceleration detection unit 27 calculates the driving level corresponding to the acceleration of the host vehicle, using the following arithmetic expression: "acceleration $[m/s^2]$ from a driving speed of 0 [km/h]÷30". When acceleration $[m/s^2]$ is greater than 300 $[m/s^2]$, the sudden unintended acceleration detection unit 27 calculates the driving level corresponding to the acceleration of the host vehicle as "10 (the degree of risk: large)". When accelerator $[m/s^2]$ is equal to or less than 0 $[m/s^2]$, the sudden unintended acceleration detection unit 27 does not calculate the driving level. As the driving level corresponding to the acceleration of the host vehicle increases, the degree of risk increases.

The signal neglect detection unit 28 calculates the driving level from the turned-on light color information detected by the signal detection unit 23 and the driving speed of the host vehicle, on the basis of whether the driver has neglected a signal. Specifically, when the traffic signal is not detected from the image even though the driving speed of the host vehicle is equal to or greater than 1 [km/h] and the color of the traffic light turned on is red, the signal neglect detection unit 28 determines that the driver has neglected the signal and sets the driving level corresponding to signal neglect to "10 (the degree of risk: large)". In contrast, when the color of the traffic light turned on is changed from red to blue and the driving speed of the host vehicle gradually increases from 0 [km/h], the signal neglect detection unit 28 determines that the driver observes the traffic signal according to the traffic rules and sets the driving level corresponding to signal neglect to "0 (the degree of risk: small)".

The sign detection unit 24 detects whether the driver has neglected a road sign, on the basis of sign detection information indicating the road sign which is provided at the driving position of the host vehicle and the driving speed of the host vehicle.

The sudden stop detection unit 30 calculates the degree of stop from the vehicle detection information of the vehicle in front and the acceleration information of the host vehicle. For example, when the distance between the host vehicle and the vehicle in front is short and the acceleration of the host vehicle is rapidly changed from a positive value to a large negative value, it means that the host vehicle has been suddenly stopped (the driver has braked sharply). When acceleration gradually decreases to zero (0) with a reduction in the distance between the host vehicle and the vehicle in front (for example, when the vehicle is gradually stopped after temporary sudden braking), it means that the host vehicle has slowed down and stopped. This corresponds to a case in which a value obtained by subtracting the acceleration which has occurred at the previous time from the acceleration which has occurred at the next time on the temporal axis is a large negative value in the host vehicle. The acceleration of the host vehicle includes, for example, acceleration when the vehicle that is being decelerated is suddenly decelerated, acceleration when the vehicle that is traveling at a uniform speed is suddenly decelerated, and acceleration when the vehicle that is being accelerated is suddenly decelerated. The sudden stop detection unit 30 calculates the degree of sudden braking and the degree of stop of the host vehicle.

Specifically, when accelerator is less than 0 [m/s$^2$] and greater than −300 [m/s$^2$], the sudden stop detection unit 30 calculates the driving level corresponding to the degree of stop of the host vehicle using the following arithmetic expression: "(acceleration [m/s$^2$]÷30)×(−1)". In contrast, when accelerator is less than −300 [m/s$^2$], the sudden stop detection unit 30 sets the driving level corresponding to the degree of stop of the host vehicle "10 (the degree of risk: large)". When accelerator is greater than 0 [m/s$^2$], the sudden stop detection unit 30 does not calculate the driving level corresponding to the degree of stop of the host vehicle. As the driving level corresponding to the degree of stop of the host vehicle increases, the degree of risk increases.

The sudden steering wheel operation detection unit 31 calculates the degree of the steering wheel operation of the host vehicle from the vehicle detection information of the vehicle in front and the acceleration information. When a steering wheel operation of suddenly changing the driving direction of the host vehicle is performed, the sudden steering wheel operation detection unit 31 detects the sudden steering wheel operation. The line neglect detection unit 32 calculates the percentage of the host vehicle accurately tracing a vehicular lane indicated by, for example, the center line and the edge line from the line detection information. The driving lane detection unit 33 counts the number of lane changes of the host vehicle on the basis of the line detection information and the acceleration information. The driving zone detection unit 34 calculates the percentage of the host vehicle keeping to the left, from the vehicle detection information of the vehicle in front and the line detection information.

When it is determined that the driving levels for all of the determination items have been calculated by the inter-vehicle distance detection unit 25 to the driving zone detection unit 34 (Step S13: No), the itemized driving determining unit 35 proceeds to Step S14. The driving level for each determination item is stored in the RAM 4. Therefore, a plurality of driving levels for each determination item are stored in the RAM 4. In Step S14, the itemized driving determining unit 35 calculates the average value of the driving levels for each determination item which is an example of the value based on the driving levels for each determination item which are stored in the RAM 4. Then, the process in the flowchart illustrated in FIG. 4 ends.

The itemized driving determining unit 35 may perform a predetermined weighting process for the average value of the driving levels for each determination item to calculate the average value. In this embodiment, the itemized driving determining unit 35 calculates the average value of the driving levels for each determination item. However, this structure is an illustrative example. In addition to the average value, a predetermined added value, a predetermined subtracted value, a predetermined divided value, a predetermined multiplied value, or a value calculated by a combination thereof may be used.

It is not preferable that the driving level, which is a negative determination result, be calculated due to sudden or inevitable dangerous driving. The driving determination device 1 according to the embodiment calculates the average value of the driving levels for each determination item. Therefore, it is possible to prevent the determination result of the driving level from being negative although dangerous driving is sporadically performed. In addition, it is possible to determine the average driving method of the driver.

Overall Driving Determination Operation

Next, the detailed flow of the overall driving determination operation in Step S6 will be described with reference to FIG. 6. In Step S5 of the flowchart illustrated in FIG. 3, when the calculation of the average value of the driving levels for each determination item ends, the overall driving determining unit 36 starts the process of the flowchart illustrated in FIG. 6 from Step S21.

In Step S21, the overall driving determining unit 36 performs a process of weight the average value of the driving levels for each determination item with a weighting coefficient which is predetermined for each determination item. Specifically, in the example illustrated in FIG. 7, in a classification "accelerator operation", the average value of the driving levels corresponding to the inter-vehicle distance is "8" and the average value of the driving levels corresponding to the time to collision is "9". In the example illustrated in FIG. 7, in the classification "accelerator operation", the average value of the driving levels corresponding to the sudden unintended acceleration is "6", the average value of the driving levels corresponding to the signal neglect is "0", and the average value of the driving levels corresponding to the sign neglect is "0".

In the example illustrated in FIG. 7, in a classification "brake operation", the average value of the driving levels corresponding to the sudden stop is "7", the average value of the driving levels corresponding to the signal neglect is "0", and the average value of the driving levels corresponding to the sign neglect is "1". In the example illustrated in FIG. 7, in a classification "steering wheel operation", the average value of the driving levels corresponding to the sudden steering wheel operation is "6", the average value of the driving levels corresponding to the white line neglect is "3", the average value of the driving levels corresponding to the excessive number of lane changes is "8", and the average value of the driving levels corresponding to the "keep left" is "4".

In the example illustrated in FIG. 7, in the classification "accelerator operation", a weighting coefficient of "3" is allocated to the driving level corresponding to the inter-vehicle distance and a weighting coefficient of "3" is allocated to the driving level corresponding to the time to collision. In the example illustrated in FIG. 7, in the classification "accelerator operation", a weighting coefficient of "2" is allocated to the driving level corresponding to the sudden unintended acceleration, a weighting coefficient of "3" is allocated to the driving level corresponding to the signal neglect, and a weighting coefficient of "2" is allocated to the driving level corresponding to the sign neglect.

In the example illustrated in FIG. 7, in a classification "brake operation", a weighting coefficient of "2" is allocated to the driving level corresponding to the sudden stop, a weighting coefficient of "3" is allocated to the driving level corresponding to the signal neglect, and a weighting coefficient of "2" is allocated to the driving level corresponding to the sign neglect. In the example illustrated in FIG. 7, in a classification "steering wheel operation", a weighting coefficient of "2" is allocated to the driving level corresponding to the sudden steering wheel operation, a weighting coefficient of "1" is allocated to the driving level corresponding to the white line neglect, a weighting coefficient of "2" is allocated to the driving level corresponding to the excessive number of lane changes, and a weighting coefficient of "1" is allocated to the driving level corresponding to the "keep left".

In Step S21 of the flowchart illustrated in FIG. 6, the overall driving determining unit 36 multiplies the average value of the driving levels for each determination item by the weighting coefficient allocated to each determination item to weight the average value of the driving levels for each determination item. Therefore, as illustrated in FIG. 7, the driving level corresponding to the inter-vehicle distance in the classification "accelerator operation" is weighted by a value of "8×3=24". In addition, the driving level corresponding to the time to collision in the classification "accelerator operation" is weighted by a value of "9×3=27". The driving level corresponding to the sudden unintended acceleration in the classification "accelerator operation" is weighted by a value of "6×2=12". The driving level corresponding to the signal neglect in the classification "accelerator operation" is weighted by a value of "0×3=0". The driving level corresponding to the sign neglect in the classification "accelerator operation" is weighted by a value of "0×2=0".

In addition, the driving level corresponding to the sudden stop in the classification "brake operation" is weighted by a value of "7×2=14". The driving level corresponding to the signal neglect in the classification "brake operation" is weighted by a value of "0×3=0". The driving level corresponding to the sign neglect in the classification "brake operation" is weighted by a value of "1×2=2".

Furthermore, the driving level corresponding to the sudden steering wheel operation in the classification "steering wheel operation" is weighted by a value of "6×2=12". The driving level corresponding to the white line neglect in the classification "steering wheel operation" is weighted by a value of "3×1=3". The driving level corresponding to the excessive number of lane changes in the classification "steering wheel operation" is weighted by a value of "8×2=16". The driving level corresponding to the "keep left" in the classification "steering wheel operation" is weighted by a value of "5×1=5".

Then, in Step S22 in the flowchart illustrated in FIG. 6, the overall driving determining unit 36 divides the sum of the weighted average values for each determination item by the sum of the weighting coefficients for all of the determination items to calculate the overall level of the driving level. Then, the process illustrated in the flowchart of FIG. 6 ends.

Specifically, in the example illustrated in FIG. 7, the sum of the weighted average values for each determination item is "24+27+12+0+0+14+0+2+12+3+16+5=115". In the example illustrated in FIG. 7, the sum of the weighting coefficients for all of the determination items is "3+3+2+3+2+2+3+2+2+1+2+1=26". Therefore, the overall driving determining unit 36 calculates the value of "115÷26" and calculates a value of "about 4.4" as the overall level of the driving level. It is possible to evaluate the driving level of the driver according to the overall level. For example, it is possible to estimate that "the driving of the driver does not violate traffic regulations, but is a little aggressive and is likely to cause an accident".

Effect of First Embodiment

As can be seen from the above description, the driving determination device 1 according to the first embodiment calculates the driving level indicating the degree of safety of the driver for each predetermined determination item. In addition, the driving determination device 1 stores the calculated driving levels for each determination item. Then, the driving determination device 1 calculates the average value of the driving levels for each determination item and determines the overall driving level of the driver, using the calculated average value of the driving levels for each determination item. Therefore, it is possible determine the driving level of the driver, on the basis of the average value of a plurality of driving levels for each determination item. As a result, it is possible to accurately determine the driving level from the long-term point of view.

Second Embodiment

Next, a driving determination device 1 according to a second embodiment will be described. The driving determination device 1 according to the first embodiment calculates the average value of the driving levels for each determination item to prevent sporadic dangerous driving from affecting the determination result of the driving level. In contrast, the driving determination device 1 according to the second embodiment detects the frequency of dangerous driving, determines the driving level, and determines the latent driving level. That is, the driving determination device 1 according to the second embodiment determines dangerous driving, considering the latent characteristics of the driver. In addition, the driving determination device 1 according to the second embodiment performs a process on the basis of the frequency of dangerous driving such that the number of dangerous driving operations is clear.

Itemized driving determination Operation According to Second Embodiment

FIG. 8 is a flowchart illustrating the flow of an itemized driving determination operation of the driving determination device 1 according to the second embodiment. In Step S4 in the flowchart of FIG. 3, when each frame of parallax images, a driving speed, and acceleration are stored in the RAM 4, the process in the flowchart of FIG. 8 corresponding to the process in Step S5 starts from Step S31. In the flowchart illustrated in FIG. 8, the processes in Steps S31 to S33 and Step S35 correspond to the processes in Steps S11 to S13 and Step S15 in the flowchart illustrated in FIG. 4. Therefore, in the flowchart illustrated in FIG. 8, only the process in Step S34, which is the difference from the first embodiment, will be described.

That is, when data for each determination item which has been described with reference to FIG. 5 is calculated, an itemized driving determining unit 35, which is an example of a count unit, counts the number of driving levels which are equal to or greater than a threshold value provided for each determination item among the driving levels for each determination item in Step S34. Therefore, it is possible to detect the frequency of driving with a driving level equal to or greater than the threshold value for each determination item.

Overall Driving Determination Operation According to Second Embodiment

FIG. 9 is a flowchart illustrating the flow of an overall driving determination operation of the driving determination device 1 according to the second embodiment.

In Step S5 in the flowchart of FIG. 3, when the counting of the number of driving levels equal to or greater than the threshold value ends, an overall driving determining unit 36 starts the process in the flowchart of FIG. 9 from Step S41.

In Step S41, the overall driving determining unit 36, which is an example of a weighting unit, weights the count values of each determination item indicating the number of driving operations with a driving level equal to or greater than the threshold value with a weighting coefficient which is predetermined for each determination item. Then, in Step S42, the overall driving determining unit 36, which is an example of an evaluation result calculation unit, calculates the sum of the weighted count values of each determination item as the overall level of the driving levels.

Effect of Second Embodiment

As can be seen from the above description, the driving determination device 1 according to the second embodiment counts the number of driving operations with the level equal to or greater than the threshold value of each determination item. Then, the driving determination device 1 according to the second embodiment calculates the sum of the weighted count values of each determination item as the overall level of the driving levels. Therefore, the driving determination device 1 according to the second embodiment can determine the latent driving level on the basis of the number of dangerous driving operations and to obtain the same effect as that in the first embodiment.

Third Embodiment

Next, a computing system according to a third embodiment will be described. The computing system according to the third embodiment collects the determination result of driving from the driving determination device 1 described in the first and second embodiments and automatically performs a driving determination process, a process of calculating the percentage of negligence in an accident, or a process of calculating car insurance.

Structure of System

FIG. 10 is a diagram illustrating the structure of the computing system according to the third embodiment. As illustrated in FIG. 10, the computing system includes one or a plurality of driving determination devices 1 and an aggregation device 44 which aggregates the driving levels for each determination item transmitted from the driving determination devices 1. The driving determination device 1 directly performs wireless communication with a base station 42 and transmits information about the driving levels to the aggregation device 44. Alternatively, the driving determination device 1 performs wireless communication with the base station 42 through a wireless communication device 41, such as a smart phone, and transmits information about the driving levels to the aggregation device 44. The driving determination device 1 may transmit the information about the driving levels to the aggregation device 44, using wired communication.

FIG. 11 is a diagram illustrating the hardware configuration of the aggregation device 44. As illustrated in FIG. 11, the aggregation device 44 includes a CPU 51, ROM 52, RAM 53, an HDD 54, an input/output I/F 55, and a communication unit 56. The CPU 51 to the communication unit 56 are connected to each other through a bus line 57.

A negligence percentage calculation program for calculating the percentage of negligence in a car accident is stored in the ROM 52. In addition, a car insurance calculation program for calculating car insurance according to the determination result of the driving level is stored in the ROM 52. For example, the car insurance calculation program may be stored in the RAM 53 or the HDD 54. The communication unit 56 performs communication with the driving determination device 1 to acquire the driving levels as the overall level. In addition, the communication unit 56 may acquire each of the driving levels for each determination item.

Operation of System

In the computing system, for example, at a predetermined time interval during driving or when a large impact is applied to the vehicle due to, for example, a collision accident, the driving determination device 1 provided in each vehicle transmits the driving levels as the overall level to the aggregation device 44. The aggregation device 44 calculates car insurance corresponding to the driving level of the driver according to the car insurance calculation program. In addition, the aggregation device 44 calculates the percentage of negligence of the driver on the basis of the determination result of the driving level of the driver who causes a car accident, according to the negligence percentage calculation program.

Effect of Third Embodiment

As described above, the driving level is determined using a plurality of stored data items. Therefore, the computing system according to the third embodiment can calculate car insurance suitable for the driving method of the driver. In addition, when the percentage of negligence of the driver in a car accident is calculated, it is possible to provide useful determination data and to obtain the same effect as that in each of the above-described embodiments.

The driving determination program may be stored in the ROM 52 of the aggregation device 44, the aggregation device 44 may collect data required to calculate the driving levels for each determination item from each driving determination device 1 and calculate the driving level of each of driving determination device 1.

Fourth Embodiment

FIG. 12 is a diagram illustrating the usage environment and schematic operation of an information providing system for evaluating driving characteristics according to a fourth embodiment. The information providing system includes a communication unit 12 which transmits the above-mentioned vehicle information including driving operation information and a camera unit 5 serving as an imaging device. The detailed structure of the vehicle illustrated in FIG. 1 is referred to.

The communication unit 12 is connected to an OBD port of the CPU 2 which generates the driving operation information in a wired manner. The camera unit 5 and the communication unit 12 communicate with each other, using near field communication such as Bluetooth (registered trademark). In addition, the camera unit 5 and the communication unit 12 may communicate with each other through a wireless LAN, such as a Wi-Fi, or a wired-line network. The camera unit 5 and the communication unit 12 communicate with, for example, the aggregation device 44 of a car insurance company through a network 43.

The CPU 2 also functions as an electronic control unit (ECU) for electronically controlling the overall operation of the vehicle and performs, for example, failure diagnosis. The CPU 2 acquires, as the vehicle information (OBD data), various kinds of information such as a vehicle speed, an engine RPM, an engine load factor, an ignition time, the pressure of an intake manifold, intake air mass (MAF), an injection start time, and the temperature of an engine coolant (coolant temperature). In addition, the CPU 2 acquires, as the vehicle information, various kinds of information, such as the temperature of air flowing to the engine (intake-air temperature), the temperature outside the vehicle (outdoor temperature), a fuel flow rate, instantaneous fuel consumption, the degree of depression of an accelerator (the degree of opening of a throttle), blinker information (operation information of the left and right blinkers), the degree of depression of a brake, and the rotation angle information of a steering wheel.

The communication unit 12 transmits the vehicle information acquired from the CPU 2 to the aggregation device 44 through the network 43. In addition, the communication unit 12 extracts driving operation information indicating the operation state of the vehicle, such as a vehicle speed, the degree of depression of the accelerator, blinker information, the degree of depression of the brake, and the rotation angle information of the steering wheel which vary depending on at least a driving operation, in the vehicle information acquired from the CPU 2, and transmits the driving operation information to the camera unit 5.

The camera unit 5 has a function of capturing at least an image in front of the vehicle and generating image information, an image analysis function capable of recognizing at least a road sign, a traffic signal, a lane, and obstacles on the road from the generated image information, an image information recording (storage) function, and an image analysis result recording (storage) function.

When the driving operation information, such as information about a brake operation (deceleration), an accelerator operation (acceleration), and a steering wheel operation (turn), is received from the communication unit 12, the camera unit 5 transmits image information corresponding to the received driving operation information and recognition result information which is the image analysis result to the aggregation device 44.

In addition, when a driving operation, such as sudden acceleration, sudden deceleration (sudden braking), or quick turning (sudden steering wheel operation), which leads to dangerous driving is detected from the driving operation information, the communication unit 12 inserts dangerous driving information indicating that dangerous driving has been performed into the driving operation information and transmits the driving operation information to the aggregation device 44. The camera unit 5 transmits the image information and the recognition result information during dangerous driving to the aggregation device 44. In addition, whether a sudden steering wheel operation has been performed is determined on the basis of whether the differential value of the rotation angle of the steering wheel is greater than a predetermined threshold value. Similarly, whether a sudden braking operation has been performed is determined on the basis of whether the differential value of the degree of depression of the brake is greater than a predetermined threshold value.

That is, the camera unit 5 independently recognizes a road sign, a traffic signal, a lane, and obstacles on the road. The camera unit 5 generates information (recognition result information) about a speed limit, a stop instruction, and the current state of a traffic signal at the time when the driving operation information (including dangerous driving information) is received from the communication unit 12. Then, the camera unit 5 transmits the generated authentication result information and the driving operation information received from the communication unit 5 to the aggregation device 44.

The camera unit 5 may transmit a video (moving image information) corresponding to a predetermined period of time before and after the time when the driving operation information is received to the aggregation device 44. For example, when it is difficult to establish a communication line between the camera unit 5 and the aggregation device 44 and to transmit a video, the video may be recorded on a recording medium in the camera unit 5. Then, when the communication line is established between the camera unit 5 and the aggregation device 44, the video stored in the recording medium may be transmitted to the aggregation device 44.

When the camera unit 5 recognizes (detects) a predetermined road sign as the result of image analysis, it may acquire driving operation information, such as a vehicle speed, from the communication unit 12 and transmit the driving operation information and the recognition result information to the aggregation device 44.

The aggregation device 44 calculates, for example, the percentage of negligence of the driver in a traffic accident, using the vehicle information and the driving operation information (including the dangerous driving information) transmitted from the camera unit 5 and the communication unit 12 of the vehicle, on the basis of the negligence percentage calculation program. In this way, it is possible to obtain the same effect as that in the third embodiment.

Fifth Embodiment

Next, a detection device according to a fifth embodiment will be described. The detection device according to the fifth embodiment appropriately detects dangerous driving caused by a lane change operation of the driver.

That is, the camera unit 5 acquires image information including an object around the vehicle and supplies the image information to the CPU 2. The CPU 2 operates on the basis of the above-mentioned driving determination program to function as the driving lane detection unit 33 illustrated in FIG. 2 and specifies the position of a white line (lane boundary) included in the image information.

Specifically, the driving lane detection unit 33 sets a region of interest (ROI) to be subjected to image analysis for detecting the white line from the image information.

FIG. 13A is a diagram illustrating an example of an ROI 202. The example illustrated in FIG. 13A shows image information including a white line 203a and a white line 203b. In addition, the example illustrated in FIG. 13A shows a case in which a lower region of the image information below a horizontal line 201 is set as the ROI 202.

Then, the driving lane detection unit 33 performs a noise reduction process of reducing noise in the ROI 202. The noise of the ROI 202 is, for example, random noise.

FIG. 13B is a diagram illustrating an example of the noise reduction process. The example illustrated in FIG. 13B shows a case in which an infinite impulse response low pass Filter (IIR-LPF) is applied from the center to the left and right sides of the image information to generate a blurred image from which the noise of the ROI 202 has been removed.

Then, the driving lane detection unit 33 performs an edge search process using the blurred image from which the noise of the ROI 202 has been removed.

FIG. 13C is a diagram illustrating an example of the edge search process. The example illustrated in FIG. 13C shows a case in which pixels indicating the edge greater than a predetermined threshold value are searched as candidate points 204a of the white line 203a and candidate points 204b of the white line 203b from the center to the left and right sides of the blurred image of the ROI 202.

Then, the driving lane detection unit 33 performs a white line detection process using a plurality of candidate points 204a of the white line and a plurality of candidate points 204b of the white line. Specifically, the driving lane detection unit 33 performs probabilistic Hough transform using a plurality of candidate points 204a of the white line to detect the white line 203a from the blurred image from which the noise of the ROI 202 has been removed. Similarly, the driving lane detection unit 33 performs the probabilistic Hough transform using a plurality of candidate points 204b of the white line to detect the white line 203b from the blurred image from which the noise of the ROI 202 has been removed. The driving lane detection unit 33 detects the white line as a straight line or a curve.

When it is determined whether the white line can be detected as a straight line, the driving lane detection unit 33 specifies a slope a and an intercept b in a line equation "y=ax+b" (x: a coordinate in the horizontal, y: a coordinate in the vertical direction) in the image information, using the probabilistic Hough transform. In addition, for example, when the number of votes of the probabilistic Hough transform, the length of the detected straight line, and the slope a of the detected straight line are equal to or less than a predetermined threshold value, the driving lane detection unit 33 determines that it is difficult to detect the white line as a straight line.

When the white line is detected as a straight line, the driving lane detection unit 33 determines whether the detected white line is reliable. Specifically, the driving lane detection unit 33 applies the IIR-LPF to the slope a and the intercept b detected from each of a predetermined number of image information items, which are received as time-series consecutive frames from the camera unit 5, for a time t to smooth the slope a and the intercept b. Then, the driving lane detection unit 33 determines whether the difference between the smoothed slope a and the smoothed intercept b and the slope a and the intercept b which are specified in the previous consecutive frames by the same method is equal to or greater than a predetermined threshold value. When the difference is equal to or greater than the predetermined threshold value, the driving lane detection unit 33 determines that the reliability is low. When the difference is less than the predetermined threshold value, the driving lane detection unit 33 determines that the reliability is high.

When it is determined whether the white line can be detected as a curve, the driving lane detection unit 33 specifies, for example, coefficients A, B, and C of a curve equation "y=Ax$^2$+Bx+C" (x: a coordinate in the horizontal direction, y: a coordinate in the vertical direction) in the image information, using the probabilistic Hough transform. In addition, for example, when the number of votes of the probabilistic Hough transform, the length of the detected curve, and the coefficients A, B, and C are equal to or less than a predetermined threshold value, the driving lane detection unit 33 determines that it is difficult to detect the white line as a curve. A reliability determination process when the white line is detected as a curve is the same as that when the white line is detected as a straight line and thus the description thereof will not be repeated.

FIG. 13D is a diagram illustrating an example of the white line detection process. The example illustrated in FIG. 13D shows a case in which the white line 203a is detected from a plurality of candidate points 204a of the white line by a line equation and the white line 203b is detected from a plurality of candidate points 204b of the white line by a line equation.

When the detected white line is reliable, the driving lane detection unit 33 inputs determination information including an equation indicating the position of the white line and image information to the driving zone detection unit 34. The driving zone detection unit 34 performs a lane change determination process of determining whether a lane change has been performed, on the basis of a change in the position of the white line indicated by the determination information from the driving lane detection unit 33. Specifically, first, the driving zone detection unit 34 calculates coordinates indicating the position of the lower end of the white line in the horizontal direction, using the equation indicating the position of the white line.

FIG. 13E is a diagram illustrating an example of the lane change determination process. FIG. 13E illustrates an example of a lower end 205a when the white line 203a is a straight line and an example of a lower end 205b when the white line 203b is a straight line. The driving zone detection unit 34 determines whether a change in coordinates indicating the position of the lower end 205a or the lower end 205b of the white line in the horizontal direction is greater than a predetermined threshold value within a predetermined period of time, on the basis of the determination information which is received in time series from the driving lane detection unit 33. When the change in the coordinates is greater than the predetermined threshold value with the predetermined period of time, the driving zone detection unit 34 determines that the vehicle has changed the lane.

Next, a determination method of the driving zone detection unit 34 will be described. When the vehicle is traveling without changing the lane, the position of the lower end 205a or the lower end 205b of the white line in the horizontal direction is changed little by little for a long time or the lower end is stabilized at the same position, as compared to a case in which the vehicle changes the lane. Therefore, when the position of the lower end 205a or the lower end 205b of the white line in the horizontal direction is largely changed in a short time, the driving zone detection unit 34 determines whether the vehicle has changed the lane, on the basis of a predetermined threshold value.

The IIR-LPF is applied to changes in position, which are detected from two adjacent image information items among the image information items received in time series from the driving lane detection unit 33, at a time t to smooth the changes in position, and the change in the position of the lower end is determined by the sum of the smoothed changes in two adjacent image information items.

Next, a case in which the lane interposed between the white line 203a and the white line 203b is a center lane of a three-lane road will be described in detail. For example, when the vehicle changes the lane to the left lane, the driving zone detection unit 34 detects that the position of the lower end 205a of the white line 203a on the image information which is received as consecutive frames in time series from the driving lane detection unit 33 is largely changed to the right side in a short time, as compared to the change when a lane change is not performed.

In addition, when the vehicle changes the lane to the right lane, the driving zone detection unit 34 detects that the position of the lower end 205b of the white line 203b on the image information which is received as consecutive frames in time series from the driving lane detection unit 33 is largely changed to the left side in a short time, as compared to the change which a lane change is not performed.

When the speed of the vehicle is greater than a predetermined threshold value, the driving zone detection unit 34 does not perform the lane change determination process. The reason is that a lane change when the speed of the vehicle is low is considered as a lane change required to the vehicles to go by each other and is not subjected to a process of detecting a dangerous driving level.

When it is determined that a lane change has not been performed, the driving zone detection unit 34 inputs a lane change notification including the time when the lane change has been determined to the overall driving determining unit 36.

When receiving the lane change notification from the driving zone detection unit 34, the overall driving determining unit 36 calculates frequency information indicating the frequency of the lane change and detects dangerous driving level information indicating the degree of dangerous driving of the driver of the vehicle, on the basis of the frequency information. Next, the frequency information and the dangerous driving level information will be described in detail.

The frequency information is, for example, information indicating the number of lane changes for a predetermined period of time. In this case, the dangerous driving level information is set to a higher level as the number of lane changes for a predetermined period of time increases. The predetermined period of time is arbitrarily set. The predetermined period of time is, for example, 10 minutes, one hour, 24 hours, one week, and 30 days. For example, when the predetermined period of time is 10 minutes, the dangerous driving level information is set to a higher level as the number of lane changes for 10 minutes increases.

In addition, the frequency information is, for example, information indicating the time interval between a lane change and the next lane change. In this case, the dangerous driving level information is set to a higher level as the time interval between a lane change and the next lane change is reduced. For example, when the time interval between a lane change and the next lane change is 9 seconds or more, the dangerous driving information is set to 1. When the time interval between a lane change and the next lane change is in the range of 6 seconds to 9 seconds, the dangerous driving level information is set to 2. When the time interval between a lane change and the next lane change is 3 seconds or less, the dangerous driving level information is set to 3.

When the dangerous driving level information is detected, the overall driving determining unit 36 inputs the dangerous driving level information to the communication unit 12. When receiving the dangerous driving level information from the overall driving determining unit 36, the communication unit 12 transmits detection information in which identification information for identifying a transmission source is associated with the dangerous driving level information to, for example, the aggregation device 44. Next, the identification information for identifying the transmission source will be described.

The transmission source may be identified for each vehicle or may be identified for each driver. When the vehicle is driven by a plurality of drivers the dangerous driving of each driver is detected, the detection device according to the fifth embodiment identifies the driver and transmits the detection information including the identification information of the driver to the aggregation device 44, for example, before the driver drives the vehicle. An embodiment of the detection device including the aggregation device 44 will be described in the following sixth embodiment.

Any driver identification method may be used. For example, a slot into which an ID card for identifying the driver may be provided in the detection device and the driver may be identified by the inserted ID card. In addition, for example, a reading unit which reads an integrated circuit (IC) card for identifying the driver using a communication standard such as near field communication (NFC) may be provided in the detection device.

In addition, the detection device may be provided with a warning unit which warns the driver of dangerous driving using, for example, a sound when the detected dangerous driving level is greater than a predetermined threshold value.

Next, a detection method of the detection device according to the fifth embodiment will be described.

FIG. 14 is a flowchart illustrating an example of the detection method of the detection device according to the fifth embodiment. First, the driving lane detection unit 33 receives the image information acquired by the camera unit 5 (Step S51). Then, the driving lane detection unit 33 performs a lane change determination process (Step S52). The lane change determination process will be described in detail below with reference to FIG. 15.

Then, when it is determined that a lane change has been performed by the lane change determination process in Step S52 (Step S53, Yes), the driving zone detection unit 34 calculates the frequency information indicating the frequency of the lane change and detects dangerous driving level information indicating the degree of dangerous driving of the driver of the vehicle on the basis of the frequency information (Step S54). When it is determined that a lane change has not been performed by the lane change determination process in Step S52 (Step S53, No), the process returns to Step S51.

Then, the communication unit 12 transmits detection information in which identification information for identifying the driver and the dangerous driving level information are associated with each other to the aggregation device 44 (Step S55).

Next, the lane change determination process in Step S52 will be described in detail.

FIG. 15 is a flowchart illustrating an example of the lane change determination process of the detection device according to the fifth embodiment. First, the driving lane detection unit 33 sets an ROI as a region to be subjected image analysis for detecting a white line from the image information (Step S61).

Then, the driving lane detection unit 33 applies the IIR-LPF from the center to the left and right sides of the image information to generate a blurred image from which the noise of the ROI has been removed (Step S62). Then, the driving lane detection unit 33 searches for pixels indicating an edge greater than a predetermined threshold value as candidate points of a white line from the center to the left and right sides of the blurred image of the ROI (Step S63). Then, the driving lane detection unit 33 performs the probabilistic Hough transform using a plurality of candidate points of a white line to detect the white line from the blurred image from which the noise of the ROI has been removed (Step S64). Then, the driving lane detection unit 33 determines whether the detected white line is reliable, using the above-mentioned method (Step S65).

When the detected white line is reliable (Step S65, Yes), the overall driving determining unit 36 determines whether a change in coordinates indicating the position of the lower end of the detected white line in the horizontal direction is greater than a predetermined threshold value within a predetermined period of time to determine whether a lane change has been performed (Step S66). When the detected white line is not reliable (Step S65, No), the lane change determination process ends.

As can be seen from the above description, in the detection device according to the fifth embodiment, the driving lane detection unit 33 analyzes the image information including objects around the vehicle to specify the position of the white line included in the image information. The driving zone detection unit 34 determines whether the vehicle has changed the line, on the basis of a change in the specified position of the white line. Then, the driving zone detection unit 34 detects the dangerous driving level indicating the degree of dangerous driving of the driver of the vehicle, on the basis of the frequency of the lane change. In this way, it is possible to appropriately detect the dangerous driving of the driver caused by a lane change.

Some or all of the driving lane detection unit 33, the driving zone detection unit 34, and the overall driving determining unit 36 may be implemented by hardware such as an IC.

Sixth Embodiment

Next, a detection system according to a sixth embodiment will be described. FIG. 16 is a diagram illustrating the structure of a detection system 200 according to the sixth embodiment. The detection system 200 according to the sixth embodiment includes a detection device 100-1, a detection device 100-2, . . . , a detection device 100-N (N is an integer equal to or greater than 1) and a server apparatus 400. The detection device 100-1, the detection device 100-2, . . . , the detection device 100-N, and the server apparatus 400 are connected to each other through a network 300. The network 300 is, for example, the Internet. The detection device 100-1, the detection device 100-2, . . . , the detection device 100-N are provided in different vehicles which are not illustrated in FIG. 16. Hereinafter, when the detection device 100-1, the detection device 100-2, . . . , the detection device 100-N are not distinguished from each other, they are simply referred to as detection devices 100.

The structure of the detection device 100 is the same as that illustrated in FIG. 1. The communication unit 12 of the detection device 100 transmits detection information in which the dangerous driving level of the driver that is detected by the method described in the fifth embodiment is associated with identification information for identifying a transmission source to the server apparatus 400. In the description of the sixth embodiment, it is assumed that the identification information for identifying the transmission source is the identification information of the driver.

FIG. 17 is a diagram illustrating an example of the structure of the server apparatus 400 in the detection system according to the sixth embodiment. The server apparatus 400 includes a communication unit 141, a storage unit 142, and an evaluation unit 143. When the detection information is received from the detection device 100, the communication unit 141 stores the detection information in the storage unit 142. The evaluation unit 143 evaluates the dangerous driving of the driver on the basis of the detection information stored in the storage unit 142. The evaluation unit 143 detects the dangerous driving of the driver, using, for example, the sum of the dangerous driving levels which are calculated for each identification information item for identifying the driver or the average value of the dangerous driving levels of the driver (the sum of the dangerous driving levels of the driver/the number of detection information items including the identification information of the driver). In this case, as the sum of the dangerous driving levels or the average value of the dangerous driving levels of the driver increases, the degree of dangerous driving of the driver increases.

Next, the hardware configuration of the server apparatus 400 in the detection system according to the sixth embodiment will be described. FIG. 18 is a diagram illustrating the hardware configuration of the server apparatus 400 in the detection system according to the sixth embodiment. The server apparatus 400 in the detection system according to the sixth embodiment includes a control device 151, a main storage device 152, an auxiliary storage device 153, a display device 154, an input device 155, and a communication device 156. The control device 151, the main storage device 152, the auxiliary storage device 153, the display device 154, the input device 155, and the communication device 156 are connected to each other through a bus line 160.

The control device 151 executes a program which is read from the auxiliary storage device 153 to the main storage device 152. The main storage device 152 is a memory such as ROM or RAM. The auxiliary storage device 153 is for example, a hard disk drive (HDD) or an optical drive. The storage unit 142 illustrated in FIG. 17 corresponds to the main storage device 152 and the auxiliary storage device 153.

The display device 154 displays, for example, the state of the server apparatus 400. The display device 154 is, for example, a liquid crystal display. The input device 155 is an interface for operating the server apparatus 400. The input device 155 is, for example, a keyboard or a mouse. The communication device 156 is an interface for connection to the network 300.

The program which is executed by the server apparatus 400 in the detection system according to the sixth embodiment is recorded as an installable or executable file on a computer-readable recording medium, such as a CD-ROM, a memory card, a CD-R, or a DVD, and is then provided as a computer program product.

In addition, the program which is executed by the server apparatus 400 in the detection system according to the sixth embodiment may be stored in a computer which is connected to the network 300, such as the Internet, may be downloaded through the network, and may be provided. In addition, the program which is executed by the server apparatus 400 in the detection system according to the sixth embodiment may not be downloaded and may be provided through the network 300 such as the Internet.

Furthermore, the program which is executed by the server apparatus 400 in the detection system according to the sixth embodiment may be incorporated into, for example, ROM of the main storage device 52 in advance and then provided.

The program which is executed by the server apparatus 400 in the detection system according to the sixth embodiment is a module including the communication unit 141 and the evaluation unit 143 illustrated in FIG. 16. The control device 151 reads the program from the storage medium and executes the program to load the communication unit 141 and the evaluation unit 143 on the main storage device 152. That is, the communication unit 141 and the evaluation unit 143 are generated on the main storage device 152. Some or all of the communication unit 141 and the evaluation unit 143 illustrated in FIG. 16 may not be implemented by software, but may be implemented by hardware such as an IC.

As can be seen from the above description, in the detection system 200 according to the sixth embodiment, the driving lane detection unit 33 analyzes the image information including objects around the vehicle to specify the position of the white line included in the image information. The driving zone detection unit 34 determines whether the vehicle has changed the line, on the basis of a change in the specified position of the white line. Then, the driving zone detection unit 34 detects the dangerous driving level indicating the degree of dangerous driving of the driver of the vehicle, on the basis of the frequency of the lane change. Then, the evaluation unit 143 evaluates the driving of the driver on the basis of the dangerous driving level of the driver stored in the storage unit 142.

Therefore, it is possible to store the dangerous driving level of the driver detected by the detection device 100 in the storage unit 142 and to evaluate the driving of the driver for a long time, on the basis of the dangerous driving level of the driver stored in the storage unit 142. As a result, the evaluation result of the driving of the driver obtained by the detection system 200 according to the sixth embodiment driver can be used to calculate car insurance.

The evaluation unit 143 may evaluate the driving of the driver, considering the dangerous driving level based on an index other than the lane change by the driver. An example of the index other than the lane change by the driver is the time to collision (TTC) which is calculated from the distance to the vehicle in front and the speed of the host vehicle. In this case, the detection device 100 transmits, for example, the dangerous driving level based on the lane change and the dangerous driving level based on the TTC to the server apparatus 400.

The analysis unit 2, the driving lane detection unit 33, the driving zone detection unit 34, the storage unit 142, and the evaluation unit 143 of the detection system 200 may be implemented by any device. For example, the storage unit 142 and the evaluation unit 143 may be implemented by the detection device 100.

Each of the above-described embodiments is illustrative and does not intend to limit the invention. Each of the new embodiments can be made in various other ways and various omissions, substitutions, and changes can be made by those skilled in the art, without departing from the scope and spirit of the invention. For example, in the above-described embodiments, the driving determination device 1 determines the driving method of the vehicle which is an example of the driving body. However, the driving determination device 1 may determine the driving method of other driving bodies such as ships, airplanes, and robots. The above-described embodiments and the modifications of the embodiments are included in the scope and spirit of the invention and are also included in the claims and equivalents thereof.

REFERENCE SIGNS LIST

1 Driving determination device
2 CPU
3 ROM
5 Camera unit
10 Acceleration sensor
11 Input/output I/F
12 Communication unit
21 Vehicle detection unit
22 Line detection unit
23 Signal detection unit
24 Sign detection unit
25 Inter-vehicle distance detection unit
26 Time-to-collision detection unit
27 Sudden unintended acceleration detection unit
28 Signal neglect detection unit
29 Sign neglect detection unit
30 Sudden stop detection unit
31 Sudden steering wheel operation detection unit
32 Line neglect detection unit
33 Driving lane detection unit
34 Driving zone detection unit
35 Itemized driving determining unit
36 Overall driving determining unit
44 Aggregation device
141 Communication unit
142 Storage unit
143 Evaluation unit
151 Control device
152 Main storage device
153 Auxiliary storage device
154 Display device
155 Input device
156 Communication device
160 Bus line
100 Detection device
200 Detection system
201 Horizontal line
202 ROI
203 White line (lane boundary)
204 Candidate point of white line
205 Lower end of white line
300 Network
400 Server apparatus

CITATION LIST

Patent Literature

PTL 1: Japanese Laid-open Patent Publication No. 2012-103919

The invention claimed is:
1. A driving determination device, comprising:
circuitry configured to
    capture an image of a driving body in a driving direction;
    acquire information that changes with movement of the driving body;
    calculate a driving level for evaluating a driving method for the driving body for each predetermined determination item of a plurality of determination items, using both the captured image and the acquired information that changes with the movement of the driving body, the plurality of determination items including a traffic signal or the plurality of determination items including a sign neglect item that indicates whether the driving body has neglected the traffic signal or a road sign;
calculate a plurality of values based on a plurality of the calculated driving levels for each determination item of the plurality of determination items; and
calculate an evaluation value, for comprehensively evaluating the driving method for the driving body, according to the plurality of values, wherein
to calculate the plurality of values, the circuitry is configured to weight each value of the plurality of values according to a corresponding weighting coefficient of a plurality of weighting coefficients, and
to calculate the evaluation value, the circuitry is configured to divide a sum of the plurality of weighted values by a sum of the plurality of weighting coefficients for each determination item of the plurality of determination items.

2. The driving determination device according to claim 1, wherein at least one of the plurality determination items includes a distance between a host driving body and a driving body in front item, a time to collision that is a time until the host driving body collides with the driving body in front item, sudden unintended acceleration of the host driving body item, the traffic signal neglect item, the sign neglect item, a sudden stop item, a sudden steering wheel operation item, a white line neglect item, an excessive number of lane changes item, and a keeping left item.

3. The driving determination device according to claim 1, wherein the circuitry is further configured to calculate an average value of the plurality of values based on the plurality of calculated driving levels for each determination item of the plurality of determination items including the traffic signal or sign neglect item.

4. The driving determination device according to claim 1, wherein the driving body is a vehicle.

5. A method, comprising:
capturing an image of a driving body in a driving direction;
acquiring information that changes with movement of the driving body;
calculating a driving level for evaluating a driving method for the driving body for each predetermined determination item of a plurality of determination items, using both the captured image and the acquired information that changes with the movement of the driving body, the plurality of determination items including a traffic signal or the plurality of determination items including a sign neglect item that indicates whether the driving body has neglected the traffic signal or a road sign;
calculating a plurality of values based on a plurality of the calculated driving levels for each determination item of the plurality of determination items; and
calculating an evaluation value, for comprehensively evaluating the driving method for the driving body, according to the plurality of values, wherein
the calculating the plurality of values includes weighting each value of the plurality of values according to a corresponding weighting coefficient of a plurality of weighting coefficients, and
the calculating the evaluation value includes dividing a sum of the plurality of weighted values by a sum of the plurality of weighting coefficients for each determination item of the plurality of determination items.

6. The driving determination device according to claim 1, wherein
one predetermined determination item is a rotation angle of a steering wheel of the driving body, and
the circuitry is further configured to
compare the rotation angle to a predetermined threshold value, and
calculate a corresponding value of the plurality of values based on whether the rotation angle exceeds the predetermined threshold value.

7. The driving determination device according to claim 1, wherein
one predetermined determination item is an acceleration the driving body, and
the circuitry is further configured to
compare the acceleration to a predetermined threshold value, and
calculate a corresponding value of the plurality of values based on whether the acceleration exceeds the predetermined threshold value.

8. The driving determination device according to claim 1, wherein
one predetermined determination item is speed of the driving body, and
the circuitry is further configured to
compare the speed to a predetermined threshold value, and
calculate a corresponding value of the plurality of values based on whether the speed exceeds the predetermined threshold value.

9. The driving determination device according to claim 8, wherein
the road sign indicates a speed limit, and
the circuitry sets the predetermined threshold value to the speed limit.

10. The driving determination device according to claim 1, wherein
one predetermined determination item is a ratio between a distance from a front of the driving body to another driving body in front of the driving body and a speed of the driving body, and
the circuitry is further configured to
compare the ratio to a predetermined threshold value, and
calculate a corresponding value of the plurality of values based on whether the ratio exceeds the predetermined threshold value.

11. The method according to claim 5, wherein at least one of the plurality determination items includes a distance between a host driving body and a driving body in front item, a time to collision that is a time until the host driving body collides with the driving body in front item, sudden unintended acceleration of the host driving body item, the traffic signal neglect item, the sign neglect item, a sudden stop item, a sudden steering wheel operation item, a white line neglect item, an excessive number of lane changes item, and a keeping left item.

12. The method according to claim 5, further comprising calculating an average value of the plurality of values based on the plurality of calculated driving levels for each determination item of the plurality of determination items including the traffic signal or sign neglect item.

13. The method according to claim 5, wherein the driving body is a vehicle.

14. The method according to claim 5, wherein
one predetermined determination item is a rotation angle of a steering wheel of the driving body, and
the method further comprises:
comparing the rotation angle to a predetermined threshold value, and calculating a corresponding value of the plurality of values based on whether the rotation angle exceeds the predetermined threshold value.

15. The method according to claim 5, wherein
one predetermined determination item is an acceleration the driving body, and
the method further comprises:
- comparing the acceleration to a predetermined threshold value, and
- calculating a corresponding value of the plurality of values based on whether the acceleration exceeds the predetermined threshold value.

16. The method according to claim 5, wherein
one predetermined determination item is speed of the driving body, and
the method further comprises:
- comparing the speed to a predetermined threshold value, and
- calculating a corresponding value of the plurality of values based on whether the speed exceeds the predetermined threshold value.

17. The method according to claim 16, wherein
the road sign indicates a speed limit, and
the method further comprises setting the predetermined threshold value to the speed limit.

18. The method according to claim 5, wherein
one predetermined determination item is a ratio between a distance from a front of the driving body to another driving body in front of the driving body and a speed of the driving body, and
the method further comprises:
- comparing the ratio to a predetermined threshold value, and
- calculating a corresponding value of the plurality of values based on whether the ratio exceeds the predetermined threshold value.

* * * * *